(12) United States Patent
Warner et al.

(10) Patent No.: US 12,656,019 B2
(45) Date of Patent: Jun. 16, 2026

(54) LIQUID DESICCANT AIR CONDITIONER MODULES HAVING INTERLOCKING PANELS FOR CONTROLLING AIRFLOW

(71) Applicant: Copeland LP, Sidney, OH (US)

(72) Inventors: Jason Warner, Greenville, OH (US); Douglas P. Pelsor, Plain City, OH (US); David Poeppelman, Troy, OH (US); Chris Cicenas, Etna, OH (US)

(73) Assignee: Copeland LP, Sidney, OH (US)

( * ) Notice: Subject to any disclaimer, the term of this patent is extended or adjusted under 35 U.S.C. 154(b) by 369 days.

(21) Appl. No.: 18/390,948

(22) Filed: Dec. 20, 2023

(65) Prior Publication Data

US 2025/0207814 A1     Jun. 26, 2025

(51) Int. Cl.
| | |
|---|---|
| *F24F 3/14* | (2006.01) |
| *B01D 53/26* | (2006.01) |
| *F24F 13/30* | (2006.01) |
| *F28F 3/08* | (2006.01) |
| *F28F 9/00* | (2006.01) |

(52) U.S. Cl.
CPC ............ *F24F 13/30* (2013.01); *B01D 53/263* (2013.01); *B01D 53/268* (2013.01); *F24F 3/1417* (2013.01); *F28F 3/08* (2013.01); *F28F 9/001* (2013.01); *B01D 2257/80* (2013.01); *B01D 2259/4508* (2013.01); *B01D 2259/65* (2013.01); *F24F 2003/1435* (2013.01); *F24F 2003/1458* (2013.01)

(58) Field of Classification Search
CPC ............ F24F 3/17; F24F 13/30; B01D 53/263
See application file for complete search history.

(56) References Cited

U.S. PATENT DOCUMENTS

| | | | |
|---|---|---|---|
| 2,537,276 | A | 1/1951 | Mcmahon et al. |
| 3,814,172 | A | 6/1974 | Shore |
| 3,973,621 | A | 8/1976 | Bow et al. |
| 4,373,347 | A | 2/1983 | Howell et al. |
| 4,582,126 | A | 4/1986 | Corey |
| 4,653,287 | A | 3/1987 | Martin, Jr. |

(Continued)

FOREIGN PATENT DOCUMENTS

| | | |
|---|---|---|
| CN | 102213471 B | 1/2013 |
| CN | 103063076 B | 3/2015 |

(Continued)

*Primary Examiner* — Robert A Hopkins
(74) *Attorney, Agent, or Firm* — Armstrong Teasdale LLP

(57) ABSTRACT

A heat exchanger includes panel assemblies arranged with airflow gaps defined between adjacent panel assemblies to allow air to flow in an airflow direction. Each panel assembly includes a frame including two header sections and a middle section, a membrane positioned on the frame, and two airflow restrictor members positioned at each header section of the frame. For each header section, a first airflow restrictor member is on a first face of the frame and a second airflow restrictor member is on a second face of the frame. For each pair of adjacent panel assemblies, the middle sections are spaced apart to define the airflow gap, and the first airflow restrictor members of a first panel assembly engage the second airflow restrictor members of a second panel assembly to form two airflow restrictors at opposite ends of the airflow gap relative to a direction other than the airflow direction.

20 Claims, 22 Drawing Sheets

(56)                 References Cited

U.S. PATENT DOCUMENTS

| | | | |
|---|---|---|---|
| 4,903,503 | A | 2/1990 | Meckler |
| 4,941,324 | A | 7/1990 | Peterson et al. |
| 5,005,371 | A | 4/1991 | Yonezawa et al. |
| 5,320,166 | A | 6/1994 | Swenson |
| 5,943,874 | A | 8/1999 | Maeda |
| 6,039,112 | A | 3/2000 | Ruppel et al. |
| 6,134,903 | A | 10/2000 | Potnis et al. |
| 6,178,762 | B1 | 1/2001 | Flax |
| 6,216,483 | B1 | 4/2001 | Potnis et al. |
| 6,282,919 | B1 | 9/2001 | Rockenfeller et al. |
| 6,315,257 | B1 | 11/2001 | Fennesz |
| 6,494,053 | B1 | 12/2002 | Forkosh et al. |
| 6,497,107 | B2 | 12/2002 | Maisotsenko et al. |
| 6,837,056 | B2 | 1/2005 | Potnis et al. |
| 6,848,265 | B2 | 2/2005 | Lowenstein et al. |
| 6,892,797 | B2 | 5/2005 | Beddome et al. |
| 7,086,249 | B2 | 8/2006 | Bae et al. |
| 7,147,071 | B2 | 12/2006 | Gering et al. |
| 7,163,052 | B2 | 1/2007 | Taras et al. |
| 7,260,945 | B2 | 8/2007 | Landry |
| 7,269,966 | B2 | 9/2007 | Lowenstein et al. |
| 7,306,650 | B2 | 12/2007 | Slayzak et al. |
| 7,398,819 | B2 | 7/2008 | Taras et al. |
| 7,806,171 | B2 | 10/2010 | Taras et al. |
| 7,819,177 | B2 | 10/2010 | Beamer et al. |
| 7,905,107 | B2 | 3/2011 | Forkosh et al. |
| 8,171,986 | B2 | 5/2012 | Klein |
| 8,171,987 | B2 | 5/2012 | Jiang et al. |
| 8,205,668 | B2 | 6/2012 | Freese, V |
| 8,222,514 | B2 | 7/2012 | Hanoka |
| 8,268,060 | B2 | 9/2012 | Hargis et al. |
| 8,800,308 | B2 | 8/2014 | Vandermeulen et al. |
| 8,999,045 | B2 | 4/2015 | Ericson et al. |
| 9,101,874 | B2 | 8/2015 | Vandermeulen |
| 9,109,808 | B2 | 8/2015 | Gerber et al. |
| 9,130,503 | B2 | 9/2015 | Vandermeulen |
| 9,140,471 | B2 | 9/2015 | Kozubal et al. |
| 9,234,665 | B2 | 1/2016 | Erb et al. |
| 9,267,696 | B2 | 2/2016 | Gerlach et al. |
| 9,276,274 | B2 | 3/2016 | Boersma et al. |
| 9,423,140 | B2 | 8/2016 | Betts et al. |
| 9,470,426 | B2 | 10/2016 | Vandermeulen |
| 9,506,697 | B2 | 11/2016 | Vandermeulen |
| 9,518,765 | B2 | 12/2016 | Laughman et al. |
| 9,631,848 | B2 | 4/2017 | Vandermeulen et al. |
| 9,709,285 | B2 | 7/2017 | Vandermeulen |
| 9,746,174 | B2 | 8/2017 | Wilhelm et al. |
| 9,810,439 | B2 | 11/2017 | Coutu et al. |
| 10,012,444 | B2 | 7/2018 | Eplee |
| 10,024,558 | B2 | 7/2018 | Vandermeulen |
| 10,041,708 | B2 | 8/2018 | Sedlak et al. |
| 10,323,867 | B2 | 6/2019 | Vandermeulen |
| 10,352,574 | B2 | 7/2019 | Hamlin et al. |
| 10,386,084 | B2 | 8/2019 | Bahar et al. |
| 10,465,996 | B2 | 11/2019 | Wintersteen et al. |
| 10,619,867 | B2 | 4/2020 | Vandermeulen |
| 10,655,870 | B2 | 5/2020 | Lowenstein |
| 10,712,024 | B2 | 7/2020 | LePoudre et al. |
| 10,739,079 | B2 | 8/2020 | Lowenstein |
| 10,782,045 | B2 | 9/2020 | LePoudre et al. |
| 10,905,997 | B2 | 2/2021 | McGee et al. |
| 10,921,001 | B2 | 2/2021 | Allen et al. |
| 10,941,948 | B2 | 3/2021 | Vandermeulen et al. |
| 10,950,877 | B2 | 3/2021 | Staeck |
| 10,962,252 | B2 | 3/2021 | LePoudre et al. |
| 11,022,330 | B2 | 6/2021 | Allen et al. |
| 11,029,045 | B2 | 6/2021 | Woods et al. |
| 11,035,618 | B2 | 6/2021 | LePoudre et al. |
| 11,092,349 | B2 | 8/2021 | LePoudre et al. |
| 11,131,468 | B2 | 9/2021 | Edström et al. |
| 11,143,467 | B2 | 10/2021 | Lynn et al. |
| 11,408,681 | B2 | 8/2022 | LePoudre |
| 11,608,996 | B2 | 3/2023 | Meggers et al. |
| 11,737,239 | B2 | 8/2023 | LePoudre |
| 11,781,775 | B2 | 10/2023 | Abdel-Salam et al. |
| 11,815,283 | B2 | 11/2023 | Ghadiri Moghaddam et al. |
| 2002/0036309 | A1 | 3/2002 | Sekiguchi et al. |
| 2003/0029185 | A1 | 2/2003 | Kopko |
| 2004/0211207 | A1 | 10/2004 | Forkosh et al. |
| 2006/0201188 | A1 | 9/2006 | Kopko |
| 2010/0090356 | A1 | 4/2010 | Sines et al. |
| 2010/0132930 | A1 | 6/2010 | Izenson et al. |
| 2011/0139218 | A1 | 6/2011 | Hanoka et al. |
| 2012/0006483 | A1 | 1/2012 | Hanoka et al. |
| 2013/0227982 | A1 | 9/2013 | Forkosh |
| 2014/0260367 | A1 | 9/2014 | Coutu et al. |
| 2015/0260420 | A1 | 9/2015 | Forkosh |
| 2015/0300754 | A1 | 10/2015 | Vandermeulen et al. |
| 2016/0138817 | A1 | 5/2016 | Hamlin et al. |
| 2016/0377302 | A1 | 12/2016 | Hamlin et al. |
| 2017/0106639 | A1 | 4/2017 | Vandermeulen et al. |
| 2017/0205090 | A1 | 7/2017 | Hollering et al. |
| 2017/0205154 | A1 | 7/2017 | Torre La et al. |
| 2017/0363305 | A1 | 12/2017 | Hamlin et al. |
| 2018/0156544 | A1 | 6/2018 | Alahyari et al. |
| 2019/0145640 | A1 | 5/2019 | Vandermeulen et al. |
| 2019/0154281 | A1 | 5/2019 | Rosenblum et al. |
| 2019/0162429 | A1 | 5/2019 | Armatis et al. |
| 2020/0096212 | A1 | 3/2020 | LePoudre |
| 2020/0173671 | A1 | 6/2020 | Rowe et al. |
| 2020/0182493 | A1 | 6/2020 | Luttik |
| 2020/0363091 | A1 | 11/2020 | Umekage et al. |
| 2022/0003464 | A1 | 1/2022 | Sakauchi |
| 2022/0099390 | A1 | 3/2022 | Dean |
| 2022/0376329 | A1 | 11/2022 | Nakamura et al. |
| 2022/0393260 | A1 | 12/2022 | Nakamura et al. |

FOREIGN PATENT DOCUMENTS

| | | | | |
|---|---|---|---|---|
| CN | 105737302 A | | 7/2016 | |
| CN | 107003021 A | * | 8/2017 | ............ F24F 3/1417 |
| DE | 102006024796 B4 | | 11/2009 | |
| EP | 1810856 A3 | | 11/2008 | |
| EP | 1769207 B1 | | 4/2009 | |
| EP | 2309193 A1 | | 4/2011 | |
| EP | 2966386 A1 | | 1/2016 | |
| EP | 2796802 B1 | | 3/2016 | |
| EP | 2960953 B1 | | 4/2018 | |
| EP | 3117157 B1 | | 8/2018 | |
| EP | 3361171 B1 | | 8/2019 | |
| EP | 3764021 A1 | | 1/2021 | |
| FR | 2886388 B1 | | 10/2007 | |
| GB | 479311 A | | 2/1938 | |
| GB | 757856 A | | 9/1956 | |
| SG | 10201605802 A1 | | 2/2017 | |
| WO | 1995010746 A1 | | 4/1995 | |
| WO | 1996019708 A1 | | 6/1996 | |
| WO | 2001073366 A1 | | 10/2001 | |
| WO | 2013094206 A1 | | 6/2013 | |
| WO | 2013172789 A1 | | 11/2013 | |
| WO | 2015086915 A1 | | 6/2015 | |
| WO | 2017185002 A1 | | 10/2017 | |
| WO | 2017185005 A1 | | 10/2017 | |
| WO | 2018191805 A1 | | 10/2018 | |
| WO | 2019162949 A1 | | 8/2019 | |
| WO | 2020026040 A1 | | 2/2020 | |
| WO | 2020026084 A3 | | 5/2020 | |
| WO | 2022216155 A1 | | 10/2022 | |

* cited by examiner

400

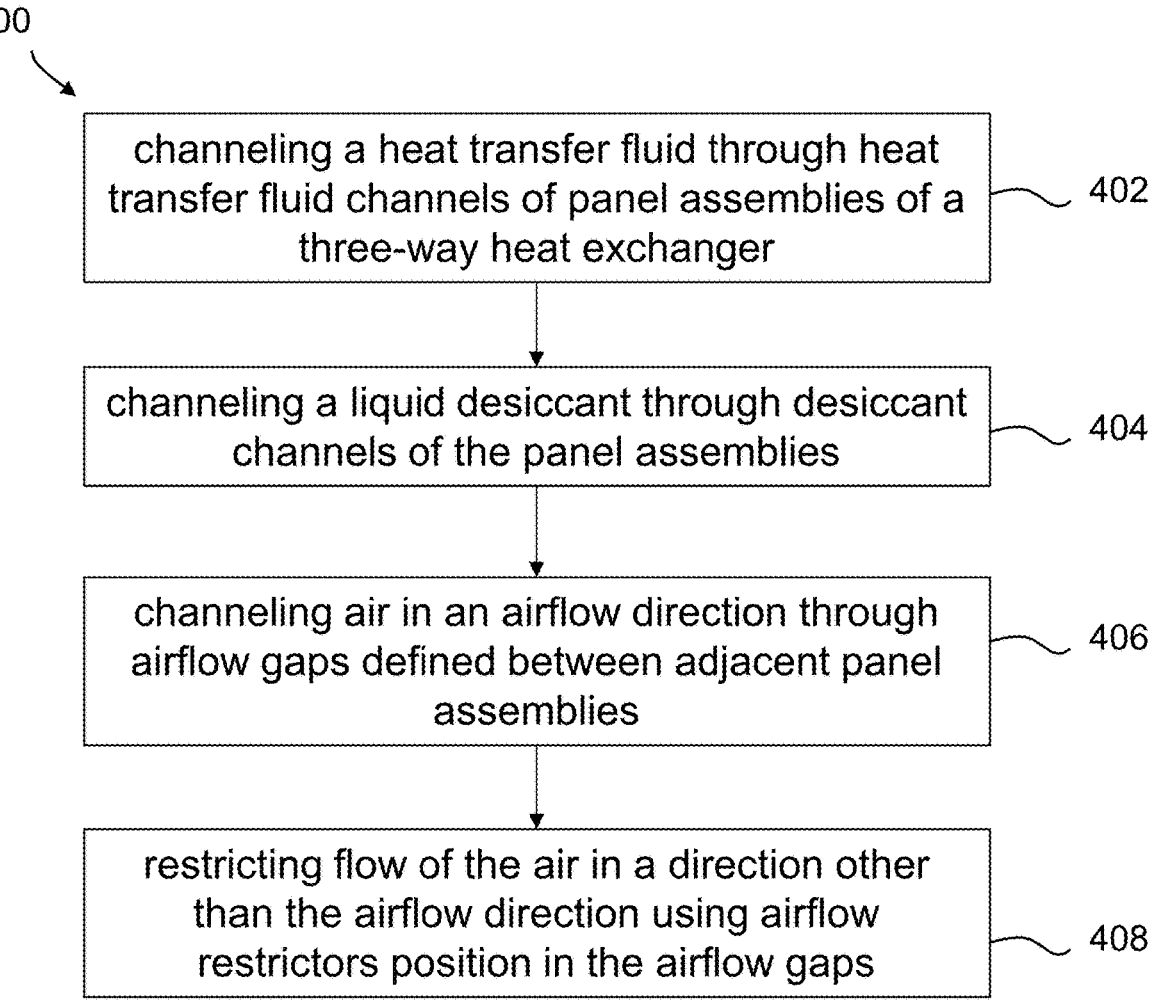

channeling a heat transfer fluid through heat transfer fluid channels of panel assemblies of a three-way heat exchanger — 402 channeling a liquid desiccant through desiccant channels of the panel assemblies — 404 channeling air in an airflow direction through airflow gaps defined between adjacent panel assemblies — 406 restricting flow of the air in a direction other than the airflow direction using airflow restrictors position in the airflow gaps — 408

FIG. 19

LIQUID DESICCANT AIR CONDITIONER MODULES HAVING INTERLOCKING PANELS FOR CONTROLLING AIRFLOW

FIELD

The field relates generally to heating, ventilation, and air conditioning (HVAC) systems, and more particularly, to HVAC systems and methods including three-way heat exchange modules for transferring heat between a heat transfer fluid, a liquid desiccant, and air.

BACKGROUND

Heating, ventilation, and air conditioning (HVAC) systems are known for their heating, cooling, and moisture removal capabilities for treating outside air that is circulated through an indoor space. The vapor compression cycle is widely used in HVAC systems to regulate the temperature and humidity of the outside air. Typically, outside air is cooled below its dew point temperature to allow moisture in the air to condense on an evaporator coil, thus dehumidifying the air. Since this process often leaves the dehumidified air at an uncomfortably cold temperature, the air is then reheated to a temperature more comfortable to a user. The process of overcooling and reheating the air can become very energy-intensive and costly.

In some applications, HVAC systems include a vapor compression system used in combination with a liquid desiccant dehumidification system to remove moisture from the outside air without cooling it below its dew point temperature. For example, HVAC systems may include a refrigerant sub-system that operates under the vapor compression cycle and an air treatment sub-system that uses heat transfer fluid and liquid desiccant to simultaneously absorb heat (sensible cooling) and moisture (latent cooling) from warm outside air to produce cooled and dehumidified indoor air. The air treatment sub-system may include three-way heat transfer equipment that facilitates sensible and latent cooling of the warm outdoor air using the heat transfer fluid and the liquid desiccant.

In operation of a three-way heat exchanger, the liquid desiccant and heat transfer fluid are channeled through the heat exchanger and heat is transferred between the liquid desiccant and the heat transfer fluid. An outdoor air stream is directed through the heat exchanger, and heat transfer fluid absorbs heat from the air stream while the liquid desiccant absorbs moisture from the air stream. The liquid desiccant may circulate between the three-way heat exchanger and a regeneration system, in which diluted liquid desiccant rejects the absorbed moisture into a sacrificial fluid. The refrigerant sub-system interfaces with the air treatment sub-system, whereby refrigerant in an evaporation stage of the vapor compression cycle absorbs heat from the heat transfer fluid in the three-way heat exchanger. The refrigerant is then channeled to a condensing stage in which the refrigerant rejects the absorbed heat into another fluid. Liquid desiccant treated by the regeneration system and heat transfer fluid treated by the refrigerant sub-system is then channeled back toward the three-way heat exchanger to again provide sensible and latent cooling of outside air.

Three-way heat exchangers may include panels that channel the heat transfer fluid and the liquid desiccant therethrough for absorbing heat and moisture from the air stream that flows between the panels. The heat transfer fluid and liquid desiccant may flow through the panels and distribute across respective flow channels in each panel. There is an ongoing need for improvements in the design and/or manufacturability of the panels that facilitate reducing costs and/or optimizing operation and efficiency of the heat exchanger.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. These statements are to be read in this light, and not as admissions of prior art.

SUMMARY

One aspect is a three-way heat exchanger operable to transfer heat between a heat transfer fluid, a liquid desiccant, and air. The three-way heat exchanger includes an airflow inlet, an airflow outlet, and panel assemblies arranged with airflow gaps defined between adjacent panel assemblies to allow the air to flow between the airflow inlet and the airflow outlet in an airflow direction. Each panel assembly includes a frame including two header sections and a middle section extending between the header sections, the middle section defining a heat transfer fluid channel, a membrane positioned on the frame and defining a desiccant channel, and two airflow restrictor members positioned at each header section of the frame. For each header section, a first airflow restrictor member is on a first face of the frame and a second airflow restrictor member is on a second face of the frame. For each pair of adjacent panel assemblies, the middle sections of the adjacent panel assemblies are spaced apart to define the airflow gap, and the first airflow restrictor members of a first panel assembly engage the second airflow restrictor members of a second panel assembly to form two airflow restrictors in the airflow gap. The airflow restrictors are located at opposite ends of the airflow gap relative to a direction other than the airflow direction.

Another aspect is a three-way heat exchanger to transfer heat between a heat transfer fluid, a liquid desiccant, and air, the three-way heat exchanger defining mutually perpendicular lateral, longitudinal, and vertical directions. The three-way heat exchanger includes an airflow inlet, an airflow outlet, and panel assemblies arranged in the lateral direction with airflow gaps defined between adjacent panel assemblies to allow the air to flow between the airflow inlet and the airflow outlet in the longitudinal direction. Each panel assembly includes a frame defining a heat transfer fluid channel and a membrane positioned on the frame and defining a desiccant channel. The three-way heat exchanger also includes two airflow restrictors located in each airflow gap between each pair of adjacent panel assemblies. Each airflow restrictor defines a tortuous path for flow of the air in the vertical direction. For each pair of adjacent panel assemblies, one of the airflow restrictors is positioned vertically above the heat transfer fluid channels and the desiccant channels and another one of the airflow restrictors is positioned vertically below the heat transfer fluid channels and the desiccant channels.

Another aspect is a method of operating a three-way heat exchanger. The method includes: channeling a heat transfer fluid through panel assemblies of the three-way heat exchanger, wherein each panel assembly includes a frame defining a heat transfer fluid channel through which the heat transfer fluid is channeled; channeling a liquid desiccant through desiccant channels of the panel assemblies defined between the frames of the panel assemblies and membranes attached to the frames; channeling air through the three-way heat exchanger in an airflow direction, wherein the air flows through airflow gaps defined between adjacent panel assemblies; and restricting flow of the air being channeled through the three-way heat exchanger in a direction other than the airflow direction using airflow restrictors positioned in the airflow gaps.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 19 is an example method of operating a three-way heat exchanger.

Corresponding reference characters indicate corresponding parts throughout the drawings.

DETAILED DESCRIPTION

Figure 1:
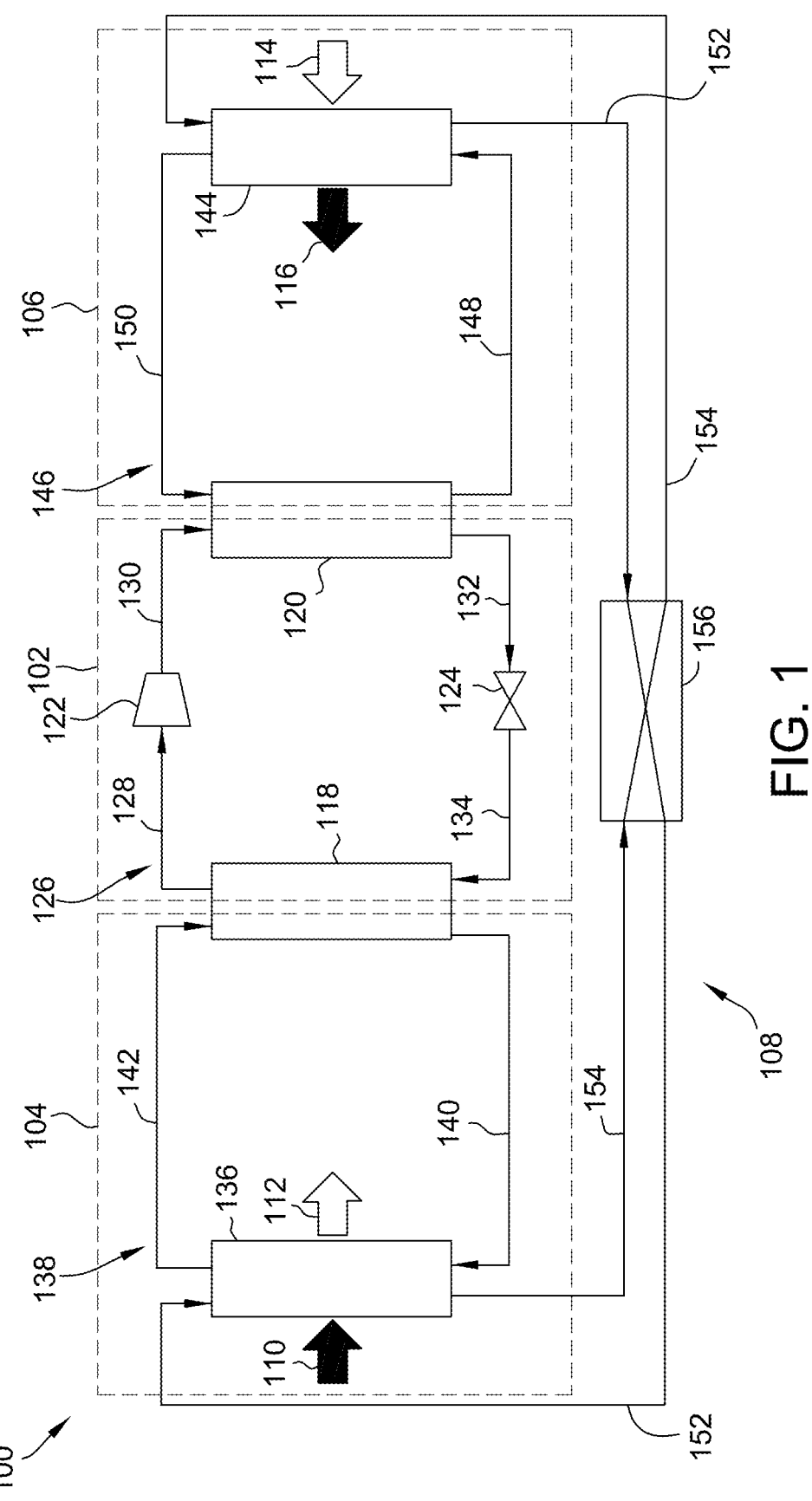
FIG. 1 is a schematic flow diagram of a heating, ventilation, and air conditioning (HVAC) system.

FIG. 1 is a schematic diagram of a heating, ventilation, and air conditioning (HVAC) system 100. The HVAC system 100 includes sub-systems 102-106 and a liquid desiccant circuit 108 which facilitate the heating, cooling, and moisture removal capabilities of the system 100. The sub-systems of the HVAC system 100 include a refrigerant sub-system 102, a conditioner sub-system 104, and a regenerator sub-system 106. The conditioner sub-system 104 and the regenerator sub-system 106 are usable to respectively treat first and second inlet air streams 110 and 114, and may be referred to herein as air treatment sub-systems 104 and 106. The HVAC system 100 may include additional components or other components than those shown and described with reference to FIG. 1.

In an example operating mode of the HVAC system 100, the conditioner sub-system 104 removes heat from the first inlet air stream 110 and channels a conditioned outlet air stream 112 to a conditioned space (not shown), such as an interior of a building structure or vehicle. The conditioned outlet air stream 112 exiting the conditioner sub-system 104 may have a lower temperature than the first inlet air stream 110. Heat removed from the first inlet air stream 110 is transferred from the conditioning sub-system 104, to the refrigerant sub-system 102, and finally to the regenerator sub-system 106. The regenerator sub-system 106 transfers the heat into the second inlet air stream 114 and channels a heated outlet air stream 116 to the atmosphere.

The refrigerant sub-system 102 includes an evaporator 118, a condenser 120, a compressor 122, and an expansion valve 124. The compressor 122 may be any suitable compressor including, but not limited to, scroll, reciprocating, rotary, screw, and centrifugal compressors. The expansion valve 124 may be any suitable expansion valve, such as a thermal expansion valve. The expansion valve 124 may alternatively be any suitable expansion device, such as an orifice or capillary tube for example. The refrigerant sub-system 102 also includes a refrigerant loop 126 that circulates a working fluid, such as a refrigerant, between the evaporator 118, the compressor 122, the condenser 120, and the expansion valve 124. The refrigerant sub-system 102 may include additional components or other components than those shown and described with reference to FIG. 1.

In an example operation of the refrigerant sub-system 102, the refrigerant in the loop 126 is channeled as a low pressure gas refrigerant 128 toward the compressor 122. The compressor 122 compresses the gas refrigerant 128, which raises the temperature and pressure of the refrigerant. Pressurized, high temperature gas refrigerant 130 exits the compressor 122 and is channeled toward the condenser 120, where the high pressure gas refrigerant 130 is condensed to a high pressure liquid refrigerant 132. The liquid refrigerant 132 exiting the condenser 120 is channeled toward the expansion valve 124 that reduces the pressure of the liquid. The reduced pressure fluid refrigerant 134, which may be a gas or a mixture of gas and liquid after passing through the expansion valve 124, is then channeled toward the evaporator 118. The fluid refrigerant 134 evaporates to a gas in the evaporator 118, exiting the evaporator as the low pressure gas refrigerant 128. The gas refrigerant 128 is then channeled back toward the compressor 122, where the gas refrigerant 128 is again compressed and the process repeats. Circulation of the refrigerant in the loop 126 may be driven by the compressor 122, and, more particularly, by a pressure differential that exists between the pressurized, high temperature gas refrigerant 130 exiting the compressor 122 and the low pressure gas refrigerant 128 entering the compressor 122. The direction of flow of the refrigerant through the loop 126, as shown in FIG. 1, may be reversed to switch the heat transfer functions of the evaporator 118 and the condenser 120, and enable the HVAC system 100 to operate in various operating modes.

The conditioner sub-system 104 includes a first three-way heat exchanger 136 and a conditioner heat transfer fluid loop 138 that circulates a conditioner heat transfer fluid (e.g., water, a glycol-based fluid, or any combination thereof) to and from the first three-way heat exchanger 136. The conditioner sub-system 104 interfaces with the refrigerant sub-system 102 via the evaporator 118. In particular, the evaporator 118 is included in the refrigerant loop 126 and the conditioner heat transfer loop 138, and facilitates transfer of heat from the conditioner heat transfer fluid in the loop 138 into the fluid refrigerant 134 in the refrigerant loop 126. The conditioner sub-system 104 may include additional components or other components than those shown and described with reference to FIG. 1. For example, the conditioner sub-system 104 may include one or more pumps (not shown) for circulating the conditioner heat transfer fluid in the loop 138 between the first three-way heat exchanger 136 and the evaporator 118. Suitable pumps that may be included in the conditioner sub-system 104 include, for example, centrifugal pumps, diaphragm pumps, positive displacement pumps, or any type of pump suitable for transferring liquid. The conditioner sub-system 104 may include additional heat transfer equipment that transfers heat from the conditioner heat transfer fluid into the atmosphere, or vice versa, depending on the operational requirements of the HVAC system 100 and other factors (e.g., a temperature and/or humidity of the first air inlet stream 110).

In an example operation of the conditioner sub-system 104, the conditioner heat transfer fluid in the loop 138 is channeled toward the evaporator 118. The conditioner heat transfer fluid is cooled in the evaporator 118 as heat is transferred from the conditioner heat transfer fluid into the fluid refrigerant 134 in the loop 126 to produce the gas refrigerant 128. Cooled conditioner heat transfer fluid 140 exiting the evaporator 118 is channeled toward and enters the first three-way heat exchanger 136. The first inlet air stream 110 is also directed through the first three-way heat exchanger 136. The first three-way heat exchanger 136 transfers heat from the first inlet air stream 110 into the conditioner heat transfer fluid 140, thus heating the conditioner heat transfer fluid. The heated conditioner heat transfer fluid 142 exiting the first three-way heat exchanger 136 is channeled back toward the evaporator 118 and the process repeats.

The regenerator sub-system 106 includes a second three-way heat exchanger 144 and a regenerator heat transfer fluid loop 146 that circulates a regenerator heat transfer fluid (e.g., water, a glycol-based fluid, or any combination thereof) to and from the second three-way heat exchanger 144. The regenerator sub-system 106 interfaces with the refrigerant sub-system 102 via the condenser 120. In particular, the condenser 120 is included in the refrigerant loop 126 and the regenerator heat transfer loop 146, and facilitates transfer of heat from the pressurized gas refrigerant 130 in the refrigerant loop 126 into the regenerator heat transfer fluid. The regenerator sub-system 106 may include additional components or other components than those shown and described with reference to FIG. 1. For example, the regenerator sub-system 106 may include one or more pumps (not shown) for circulating the regenerator heat transfer fluid in the loop 146 between the second three-way heat exchanger 144 and the condenser 120. Suitable pumps that may be included in the regenerator sub-system 106 include, for example, centrifugal pumps, diaphragm pumps, positive displacement pumps, or any type of pump suitable for transferring liquid. The regenerator sub-system 106 may include additional heat transfer equipment that transfers heat from the atmosphere into the regenerator heat transfer fluid, or vice versa, depending on the operational requirements of the HVAC system 100 and other factors (e.g., a temperature and/or humidity of the first air inlet stream 110).

In an example operation of the regenerator sub-system 106, the regenerator heat transfer fluid in the loop 146 is channeled toward the condenser 120. The regenerator heat transfer fluid is heated in the condenser as heat is transferred from the pressurized gas refrigerant 130 in the loop 126 into the regenerator heat transfer fluid to produce the liquid refrigerant 132. Heated regenerator heat transfer fluid 148 exiting the condenser is channeled toward and enters the second three-way heat exchanger 144. The second inlet air stream 114 is also directed through the second three-way heat exchanger 144. The second three-way heat exchanger 144 transfers heat from the regenerator heat transfer fluid into the second inlet air stream 114, thus cooling the regenerator heat transfer fluid. The heated outlet air stream 116 exiting the second three-way heat exchanger 144 has a greater temperature than the second inlet air stream 114. The cooled regenerator heat transfer fluid 150 exiting the three-way heat exchanger 144 is channeled back toward the condenser 120 and the process repeats.

The HVAC system 100 also includes the liquid desiccant circuit 108 that operates in conjunction with the sub-systems 102-106 to facilitate conditioning the first inlet air stream 110 by latent and sensible cooling. The liquid desiccant circuit 108 includes a liquid desiccant that is channeled between the first and second three-way heat exchangers 136 and 144. Suitable liquid desiccants that may be used in the liquid desiccant circuit 108 include, for example, desiccant salt solutions, such as solutions of water and lithium chloride (LiCl), lithium bromide (LiBr), calcium chloride (CaCl$_2$)), or any combination thereof, triethylene glycol, sodium hydroxide, sulfuric acid, and so-called ionic liquid desiccants, or organic salts that are liquid at room temperature and have organic cations and organic or inorganic anions.

The liquid desiccant circuit 108 may include one or more pumps (not shown) for channeling the liquid desiccant between the first three-way heat exchanger 136 and the second three-way heat exchanger 144. Suitable pumps that may be included in the liquid desiccant circuit 108 include, for example, centrifugal pumps, diaphragm pumps, positive displacement pumps, or any type of pump suitable for transferring liquid. The liquid desiccant circuit 108 may include one or more pumps for transferring the liquid desiccant from the second heat exchanger 144 toward the first heat exchanger 136 and one or more pumps for transferring the diluted liquid desiccant 154 from the first heat exchanger 136 toward the second heat exchanger 144.

Concentrated liquid desiccant 152 in the liquid desiccant circuit 108 is channeled toward the first three-way heat exchanger 136 of the conditioner sub-system 104, where the concentrated liquid desiccant 152 removes moisture from the first inlet air stream 110. The concentrated liquid desiccant 152 cooperates with the cooled conditioner heat transfer fluid 140 in the first three-way heat exchanger 136 to absorb heat and moisture from the first inlet air stream 110. The conditioned outlet air stream 112 exiting the first three-way heat exchanger 136 may have a lower humidity and/or a lower temperature than the first inlet air stream 110. The liquid desiccant, having absorbed moisture from the first inlet air stream 110, exits the first three-way heat exchanger 136 as diluted liquid desiccant 154.

The diluted liquid desiccant 154 is channeled toward the second three-way heat exchanger 144 of the regenerator sub-system 106, where the diluted liquid desiccant 154 rejects moisture into the second inlet air stream 114. The diluted liquid desiccant 154 cooperates with the heated regenerator heat transfer fluid 148 in the second three-way heat exchanger 144 to reject heat and moisture into the second inlet air stream 114. The heated outlet air stream 116 exiting the second three-way heat exchanger 144 thus has a greater humidity as well as a higher temperature than the second inlet air stream 114. The liquid desiccant, having rejected moisture into the second inlet air stream 114, exits the regenerator sub-system 106 as concentrated liquid desiccant 152. The concentrated liquid desiccant 152 exiting the second three-way heat exchanger 144 is channeled back toward the first three-way heat exchanger 136, and the process repeats.

The liquid desiccant circuit 108 may also include a desiccant-desiccant heat exchanger 156 for transferring heat from the concentrated liquid desiccant 152 that has exited the second three-way heat exchanger 144 to the diluted liquid desiccant 154 that has exited the first three-way heat exchanger 136. The desiccant-desiccant heat exchanger 156 may facilitate improving the functions of the liquid desiccant in the three-way heat exchangers 136 and 144. For example, the desiccant-desiccant heat exchanger 156 may reduce a temperature of the concentrated liquid desiccant 152 to provide greater cooling and dehumidifying capabilities of the first three-way heat exchanger 136. Additionally and/or alternatively, the desiccant-desiccant heat exchanger 156 may increase a temperature of the diluted liquid desiccant 154 to enable the diluted liquid desiccant 154 to desorb a greater amount of moisture in the second three-way heat exchanger 144. The desiccant-desiccant heat exchanger 156 may be an inline heat exchanger or any suitable heat exchanger that facilitates direct heat transfer between the concentrated liquid desiccant 152 and the diluted liquid desiccant 154. The desiccant-desiccant heat exchanger 156 may alternatively facilitate indirect heat exchange between the concentrated liquid desiccant 152 and the diluted liquid desiccant 154, such as via a vapor compression heat pump. Auxiliary heating and cooling sources (e.g., heating and cooling fluid, such as water) may also be utilized, in addition to or in lieu of the heat exchanger 156, to respectively heat the diluted liquid desiccant 154 and cool the concentrated liquid desiccant 152. The liquid desiccant circuit 108 may include additional components or other components than those shown and described with reference to FIG. 1.

Thus, in the example operating mode of the HVAC system 100, sensible cooling of the first inlet air stream 110 is facilitated by the first three-way heat exchanger 136 of the conditioner sub-system 104, which transfers heat from the inlet air stream 110 into the conditioner heat transfer fluid. The heat removed from the first inlet air stream 110 is then transferred sequentially between the sub-systems 104, 102, and 106 via the evaporator 118 and the condenser 120, and eventually is rejected into the second inlet air stream 114 via the second three-way heat exchanger 144. Latent cooling of the first inlet air stream 110 is also facilitated by the first three-way heat exchanger 136, which removes moisture from the inlet air stream 110 using the concentrated liquid desiccant 152. The moisture absorbed by the diluted liquid desiccant 154 is desorbed in the second three-way heat exchanger 144 into the second inlet air stream 114, which regenerates the concentrated liquid desiccant 152 that is then channeled back toward the first three-way heat exchanger 136.

The HVAC system 100 may operate in alternative operating modes than the example operating mode described above with reference to FIG. 1. The example operating mode of the HVAC system 100 described above may be considered a warm weather operating mode of the HVAC system 100, in which warm, humid air in the first inlet air stream 110 is cooled and dehumidified using the conditioner sub-system 104 and the heat and moisture removed is transferred by the sub-systems 102 and 106 and the liquid desiccant circuit 108 and rejected into the second inlet air stream 114 to produce the heated, humidified outlet air stream 116 that is directed into the warm, humid ambient. In a cold weather operating mode of the HVAC system 100, the operation of the sub-systems 102-106 and the liquid desiccant circuit 108 may be reversed such that the first three-way heat exchanger 136 heats and humidifies cool, dry air in the first inlet air stream 110 to produce warm air with a comfortable humidity level in the outlet air stream 112 that is channeled to a conditioned space. In the cold weather operating mode, the direction of flow of the refrigerant in the loop 126 and the liquid desiccant in the liquid desiccant circuit 108 may be reversed, such that the air treatment sub-systems 104 and 106 switch their respective functions, or intake and outlet vents for the first and second inlet air streams 110 and 114 may be rearranged and/or reconfigured such that the direction of airflow directed through the first and second three-way heat exchangers 136 and 144 is reversed, with the outlet air stream 112 being channeled toward the ambient environment and the outlet air stream 116 being channeled toward the conditioned space. In still other operating modes of the HVAC system 100, depending on the operational requirements and desired setpoint temperature and humidity level within the conditioned space, one of the air treatment sub-system 104 and 106 may be idle or omitted from the HVAC system 100. For example, the air treatment sub-system 106 may be omitted and the refrigerant sub-system 104 may reject or absorb heat from a refrigerant-air heat exchanger 120, depending on the operating mode of the HVAC system 100. Where the regenerator sub-system 106 is omitted or idle, liquid desiccant in the liquid desiccant circuit 108 that is cycled through the first three-way heat exchanger 136 may be regenerated or diluted, depending on the operating mode of the HVAC system 100, using auxiliary regeneration equipment, dilution tanks, or the like.

Still with reference to FIG. 1, the first three-way heat exchanger 136 and the second three-way heat exchanger 144 have substantially the same configuration. In alternative embodiments, the first three-way heat exchanger 136 and the second three-way heat exchanger 144 may have a different configuration. Although the conditioner sub-system 104 and the regenerator sub-system 106 are shown in FIG. 1 to include one three-way heat exchanger 136 and 144, respectively, any suitable number of three-way heat exchangers 136 and 144 may be included in the respective sub-system 104 and 106. The number of three-way heat exchangers 136 included in the conditioner sub-system 104 may be the same or different than the number of three-way heat exchangers 144 included in the regenerator sub-system 106. Where the conditioner sub-system 104 includes multiple three-way heat exchangers 136, the heat exchangers 136 may operate in series, in parallel, or any combination thereof. Where the regenerator sub-system 106 includes multiple three-way heat exchangers 144, the heat exchangers 144 may operate in series, in parallel, or any combination thereof.

Figure 2:
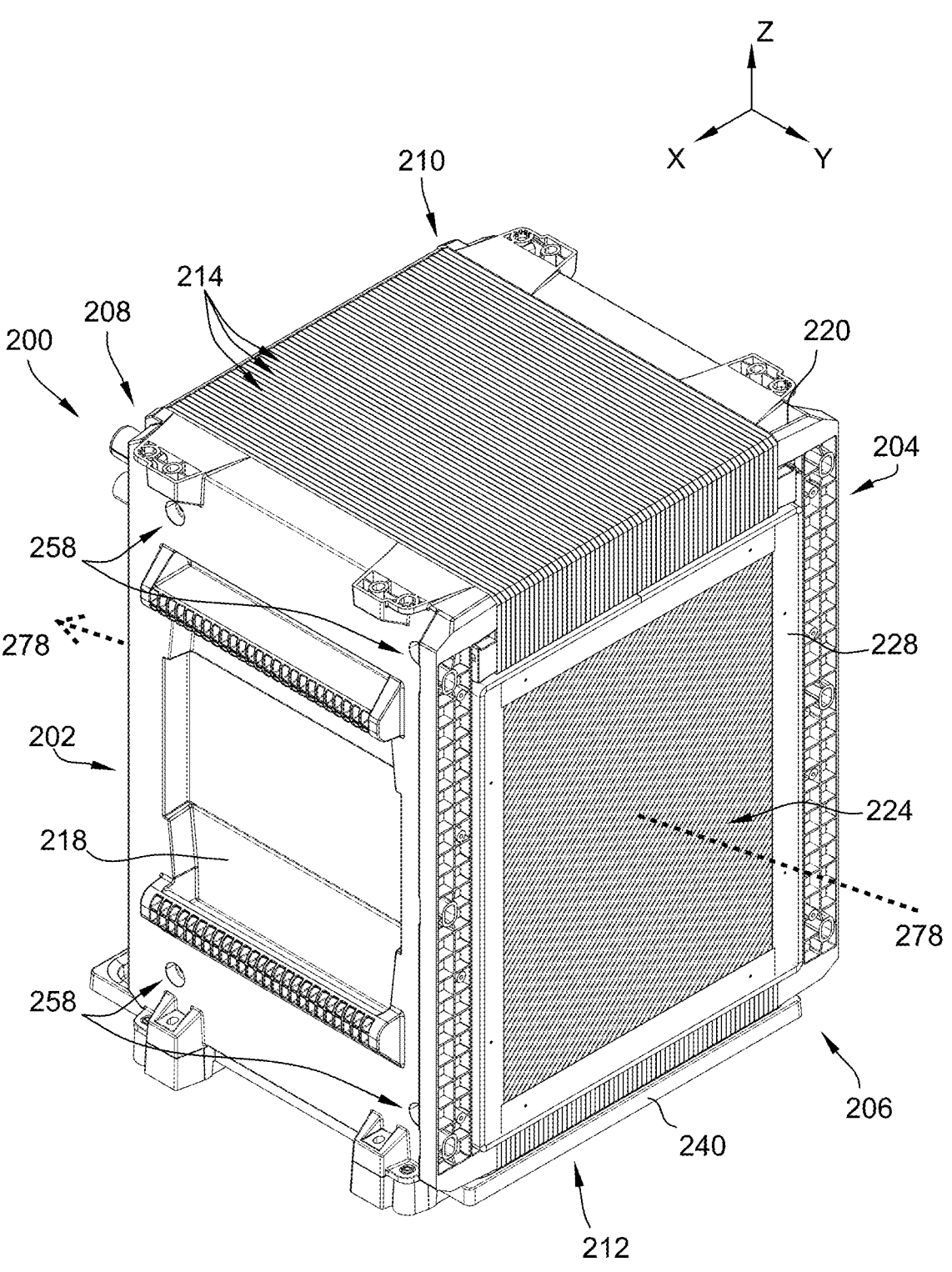
FIG. 2 is a front perspective of a three-way heat exchanger included in the HVAC system of FIG. 1.
Figure 3:
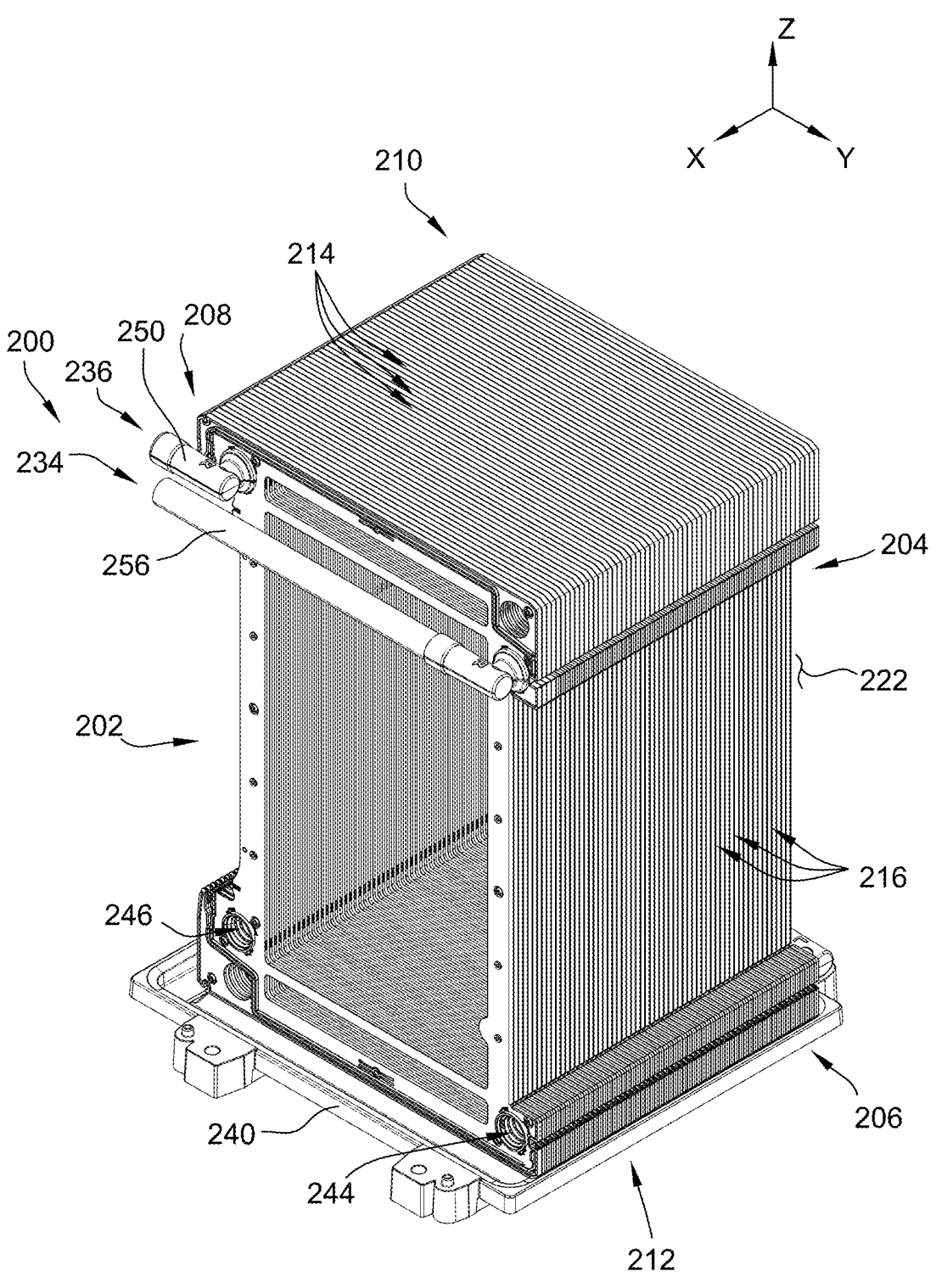
FIG. 3 is a front perspective of the three-way heat exchanger, with various components omitted to show internal components.
Figure 4:
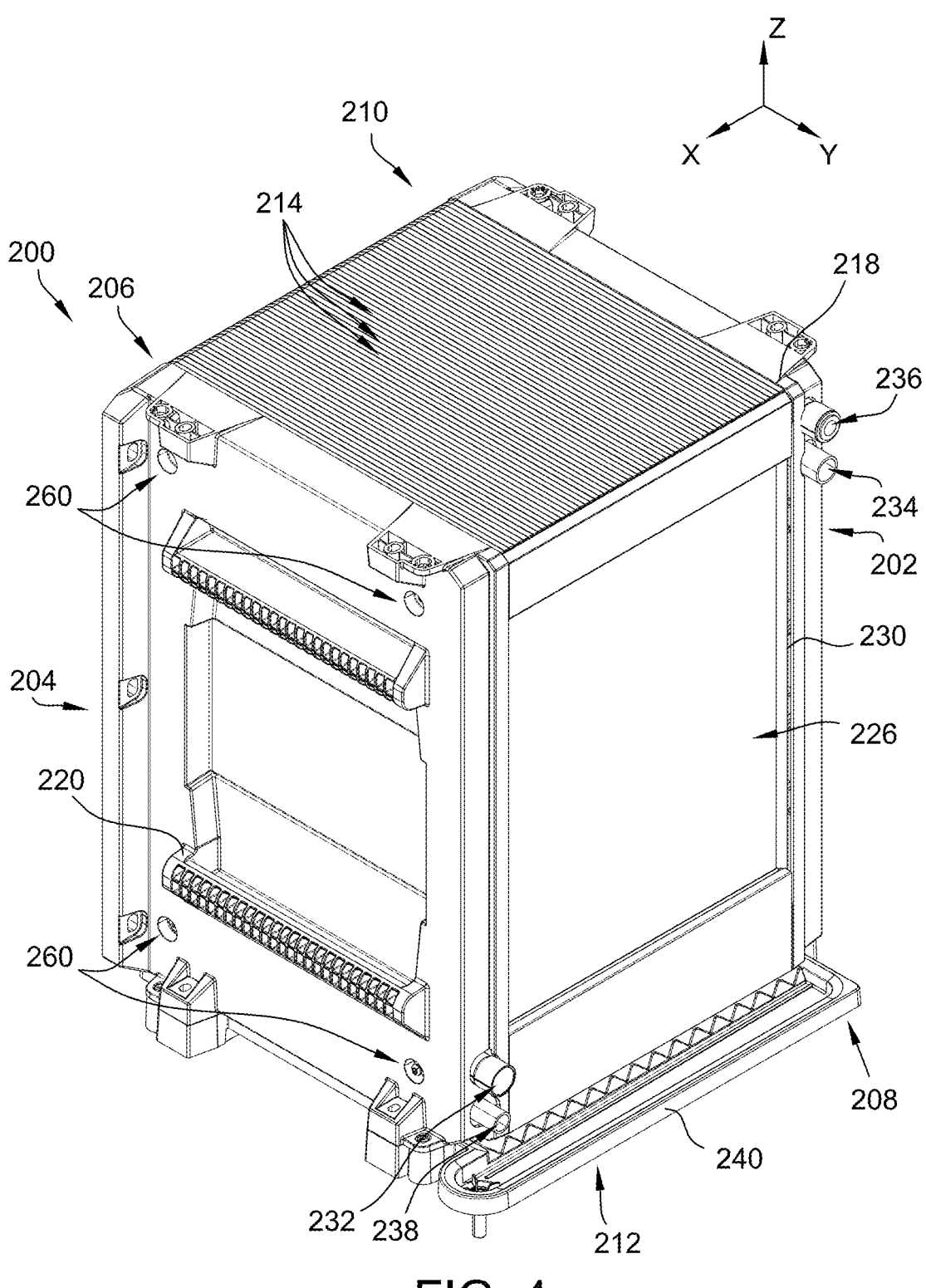
FIG. 4 is a rear perspective of the three-way heat exchanger.
Figure 5:
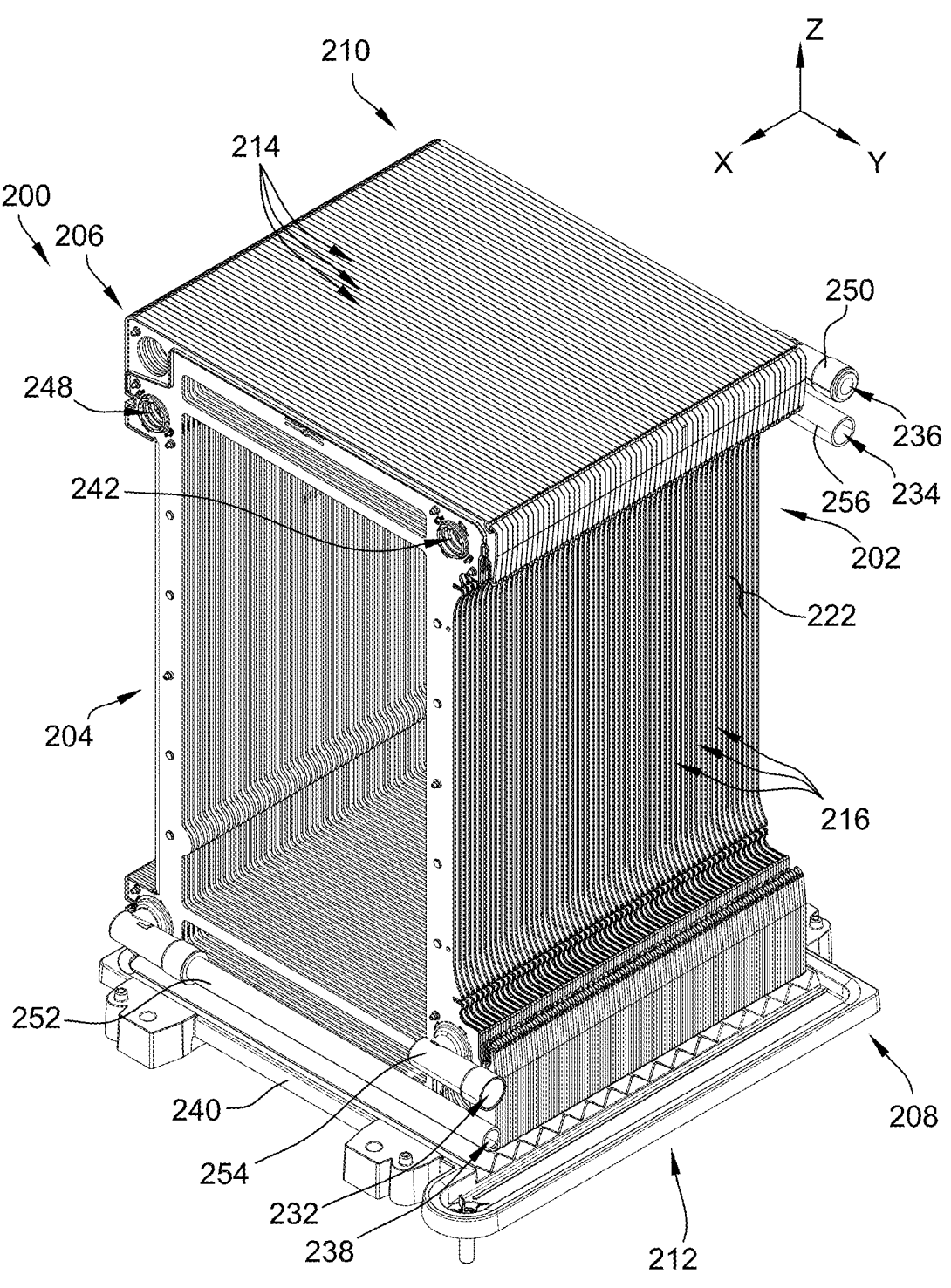
FIG. 5 is a rear perspective of the three-way heat exchanger with various components omitted, similar to FIG. 3.

Referring now to FIGS. 2-5, an example three-way heat exchanger 200 for use in an air treatment sub-system of the HVAC system 100 of FIG. 1 will now be described. The three-way heat exchanger 200 may be implemented as a first three-way heat exchanger 136 in the conditioner sub-system 104 and/or as a second three-way heat exchanger 144 in the regenerator sub-system 106. FIG. 2 is a front perspective of the three-way heat exchanger 200. FIG. 3 is a front perspective of the three-way heat exchanger 200 with various components omitted to show internal components of the three-way heat exchanger 200. FIG. 4 is a rear perspective of the three-way heat exchanger 200. FIG. 5 is a rear perspective of the three-way heat exchanger 200 with various components omitted, similar to FIG. 3.

The three-way heat exchanger 200 has a dimension in the X-axis, Y-axis and Z-axis, respectively. The X-axis, Y-axis and Z-axis are each mutually perpendicular. As described herein with respect to the three-way heat exchanger 200 and components of the heat exchanger 200 when assembled, dimensions in the Z-axis may be referred to as a "height," dimensions in the Y-axis may be referred to as a "length," and dimensions in the X-axis may be referred to as a "width." The three-way heat exchanger 200 defines a lateral direction in the X-axis, a longitudinal direction in the Y-axis, and a vertical direction in the Z-axis. The X-axis may also be referred to herein as a lateral axis, the Y-axis may also be referred to herein as a longitudinal axis, and the Z-axis may also be referred to herein as a vertical axis. The three-way heat exchanger 200 has respectively opposite first and second lateral sides 202 and 204, first and second longitudinal sides 206 and 208, and first and second vertical sides 210 and 212. The first and second lateral sides 202 and 204 are spaced apart in the lateral direction, the first and second longitudinal sides 206 and 208 are spaced apart in the longitudinal direction, and the first and second vertical sides 210 and 212 are spaced apart in the vertical direction. Directional terms are used for solely for description of the three-way heat exchanger 200 and the spatial relation of the components of the heat exchanger. The examples shown and described are not limited to any particular orientation.

The three-way heat exchanger 200 includes a set of panel assemblies 214 (also referred to as multilayer panels) arranged in succession or series in the lateral direction between the first lateral side 202 and the second lateral side 204. The individual panel assemblies 214 will be described in more detail below with reference to FIGS. 7-10. Each panel assembly 214 is in the form of a plate structure that has an internal heat transfer fluid channel through which a heat transfer fluid, such as the conditioner heat transfer fluid in the loop 138 or regenerator heat transfer fluid in the loop 146, flows. Each panel assembly 214 also includes liquid desiccant channels on opposite sides of the heat transfer fluid channel. A liquid desiccant, such as the concentrated liquid desiccant 152 or the diluted liquid desiccant 154 in the liquid desiccant circuit 108, flows through the liquid desiccant channels. Liquid desiccant flowing through the liquid desiccant channels is separated from the heat transfer fluid flowing through the heat transfer fluid channel of the respective panel assembly, and heat is exchanged between the liquid desiccant in the liquid desiccant channels and the heat transfer fluid flowing through the heat transfer fluid channel. Airflow gaps 216, also referred to as air gaps 216, are defined between adjacent panel assemblies 214 in the lateral direction. Each airflow gap 216 extends primarily in the vertical and longitudinal directions.

Any suitable number of panel assemblies 214 may be included in the three-way heat exchanger 200. For example, the three-way heat exchanger 200 may include from 1 to 200 panel assemblies 214, from 1 to 100 panel assemblies 214, from 50 to 200 panel assemblies 214, from 50 to 100 panel assemblies 214, such as one panel assembly, ten panel assemblies 214, twenty panel assemblies 214, thirty panel assemblies 214, forty panel assemblies 214, fifty panel assemblies 214, sixty panel assemblies 214, seventy panel assemblies 214, eighty panel assemblies 214, ninety panel assemblies 214, 100 panel assemblies 214, or greater than 100 panel assemblies 214.

The panel assemblies 214 are supported on a base 240 at the second vertical side 212 of the three-way heat exchanger 200. The panel assemblies 214 extend substantially parallel to one another between the base 240 and the first vertical side 210 of the three-way heat exchanger 200. The panel assemblies 214 may, in an example operation of the three-way heat exchanger 200, deviate from a substantially parallel extent as fluid flows through the panel assemblies 214 and/or as air flows through the air gaps 216 between adjacent panel assemblies 214. The base 240 includes a liquid desiccant reservoir (shown in FIGS. 4 and 5) adjacent the airflow outlet 226 at the second longitudinal side 208 and the second vertical side 212. The liquid desiccant reservoir extends longitudinally outward beyond the panel assemblies 214 and may collect liquid desiccant that is entrained in and subsequently removed from the air stream at the airflow outlet 226 using a liquid desiccant mist trap, described, for example, in U.S. patent application Ser. No. 18/391,384, titled "LIQUID DESICCANT AIR CONDITIONER MODULES HAVING A LIQUID DESICCANT MIST TRAP," filed Dec. 20, 2023, the disclosure of which is incorporated by reference in its entirety.

The three-way heat exchanger 200 includes a first end plate 218 and a second end plate 220 at the first and second lateral sides 202 and 204, respectively. The end plates 218, 220 may also be referred to as end covers or end sheets. The end plates 218 and 220 may provide lateral support for the set of panel assemblies 214 and enclose an interior 222 of the three-way heat exchanger 200 at the first and second lateral sides 202 and 204. The end plates 218 and 220 are omitted from FIGS. 3 and 5 to show the arrangement of the panel assemblies 214, the airflow gaps 216 defined between adjacent panel assemblies 214, and the interior 222 of the three-way heat exchanger 200 in greater detail.

Each end plate 218 and 220 includes alignment apertures 258 and 260, respectively, for receiving clamping assemblies (not shown) used to clamp the panel assemblies 214 together. Example clamping assemblies suitable for use in the three-way heat exchanger 200 are described in U.S. patent application Ser. No. 18/490,984, filed Oct. 20, 2023, the disclosure of which is incorporated by reference in its entirety.

The interior 222 of the three-way heat exchanger 200 may be enclosed at the first and second vertical sides 210 and 212 of the three-way heat exchanger by the set of panel assemblies 214. For example, adjacent panel assemblies 214 may be connected and/or in contact with one another at opposite vertical ends to seal the respective airflow gap 216 defined therebetween at the opposite vertical ends and to enclose the interior 222 of the three-way heat exchanger at the first and second vertical sides 210 and 212. Additionally and/or alternatively, the three-way heat exchanger 200 may include vertical end plates (not shown) to enclose the interior 222 at the first and second vertical sides 210 and 212.

The three-way heat exchanger 200 includes an airflow inlet 224 on the first longitudinal side 206 and an airflow outlet 226 on the second longitudinal side 208. The airflow inlet 224 and the airflow outlet 226 are respectively defined by longitudinal side panels 228 and 230 of the three-way heat exchanger 200. For example, the longitudinal side panels 228 and 230 may include openings in the form of grated or grille openings, shutters, louvers, dampers, or may have any other suitable open configuration to enable airflow to enter into and exit the three-way heat exchanger 200. In some examples, one or both of the longitudinal side panels 228 and 230 may include a filter to filter particulate and/or contaminants from an air stream that is treated by the three-way heat exchanger 200. The airflow inlet 224 and the airflow outlet 226 are in communication with the airflow gaps 216 defined between the adjacent panel assemblies 214, and allow an inlet air stream (e.g., the first or second inlet air stream 110 or 114 in FIG. 1) to flow in an airflow direction (indicated by the arrow 278 in FIG. 2) through the three-way heat exchanger 200 in the longitudinal direction (e.g., horizontally). The airflow direction 278 is in the longitudinal direction in the illustrated example. The airflow direction 278 may be additionally and/or alternatively be in the lateral and/or vertical directions. The longitudinal side panels 228 and 230 are omitted from FIGS. 3 and 5 to show the arrangement of the panel assemblies 214, the airflow gaps 216 defined between adjacent panel assemblies 214, and the interior 222 of the three-way heat exchanger 200 in greater detail.

The three-way heat exchanger 200 also includes heat transfer fluid inlet 232 and outlet 234 and liquid desiccant inlet 236 and outlet 238. Heat transfer fluid (e.g., circulating in one of the heat transfer fluid loops 138 or 146 in FIG. 1) enters into and exits the three-way heat exchanger 200 via the heat transfer fluid inlet 232 and outlet 234, respectively. Liquid desiccant (e.g., circulating the liquid desiccant circuit 108 in FIG. 1) enters into and exits the three-way heat exchanger 200 via the liquid desiccant inlet 236 and outlet 238, respectively. The locations of the heat transfer fluid inlet 232 and outlet 234 and the liquid desiccant inlet 236 and outlet 238 may vary depending on a desired flow direction of the heat transfer fluid and the liquid desiccant through the panel assemblies 214. The liquid desiccant inlet 236 and the heat transfer fluid outlet 234 may be defined by (e.g., made integral with) the end plate 218 and the liquid desiccant outlet 238 and the heat transfer fluid inlet 232 may be defined by (e.g., made integral with) the end plate 220. Alternatively, the heat transfer fluid inlet 232 and outlet 234 and the liquid desiccant inlet 236 and outlet 238 may each be defined by a conduit (e.g., a pipe, tube, hose, or other suitable fluid conduit) that extends longitudinally through an opening in the respective end plate 218 and 220.

Figure 7:
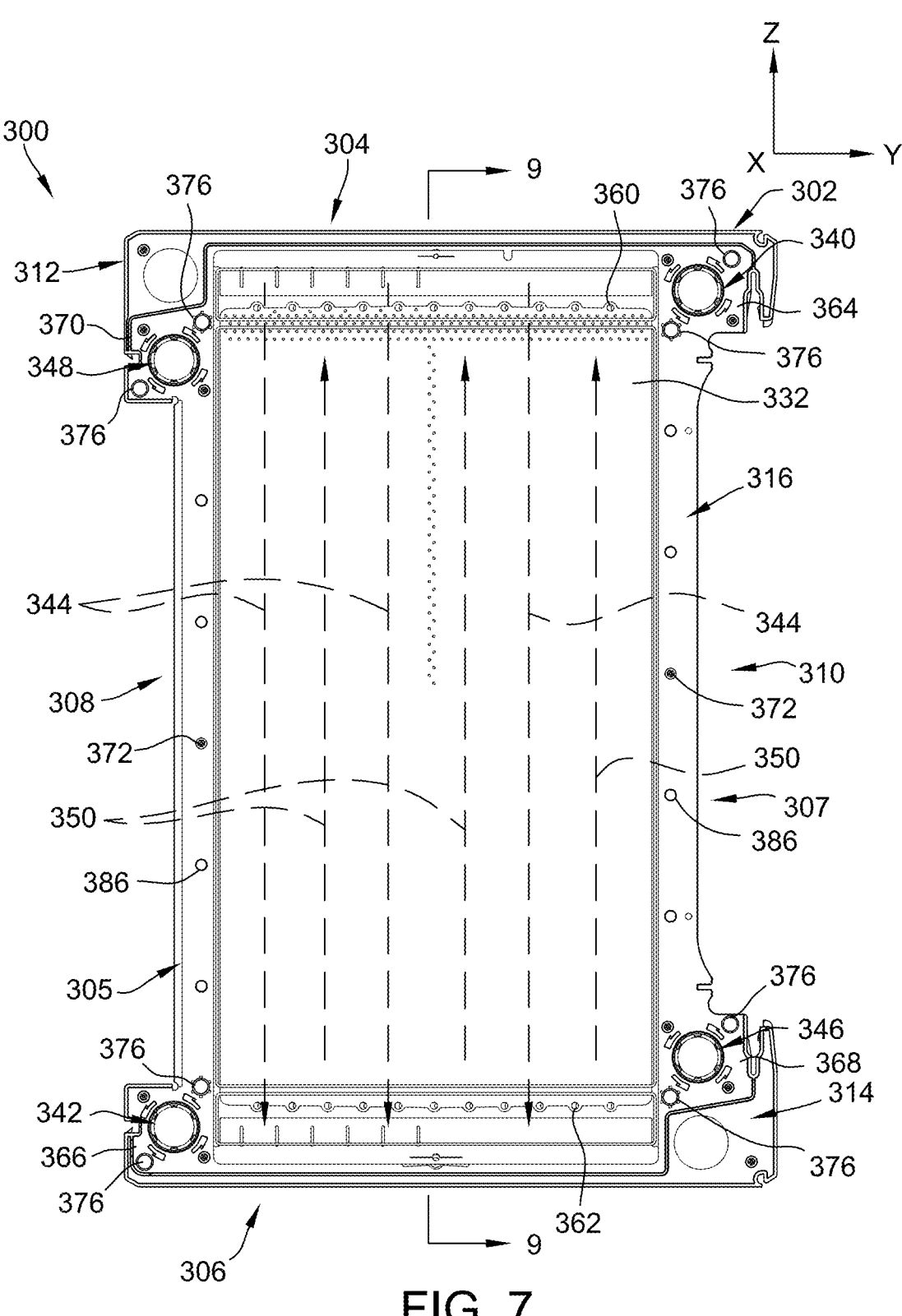
FIG. 7 is a right side elevation of an example panel assembly included in the three-way heat exchanger of FIGS. 2-6.
Figure 8:
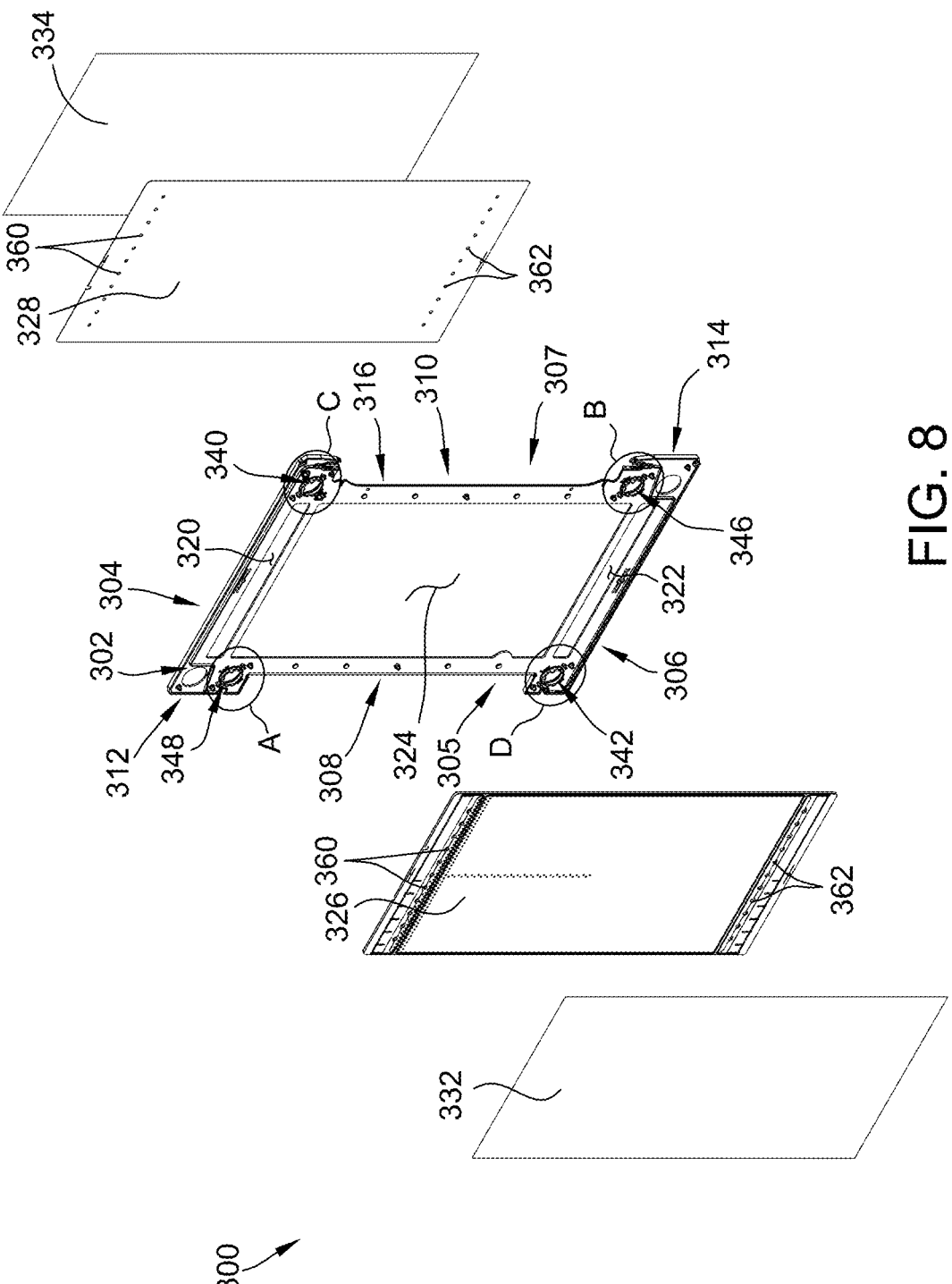
FIG. 8 is an exploded view of the panel assembly of FIG. 7.
Figure 9:
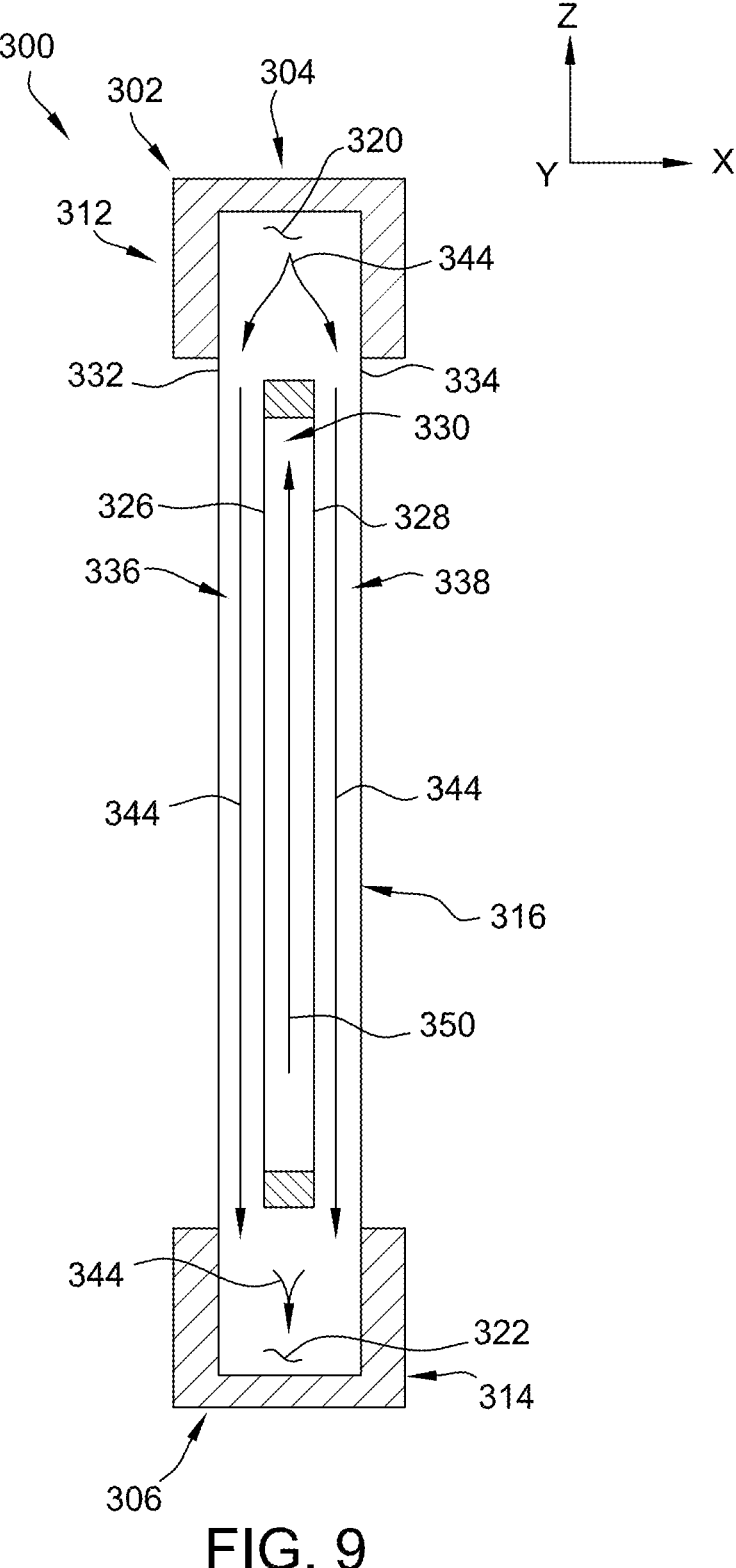
FIG. 9 is a schematic section of the panel assembly taken along section line 9-9 in FIG. 7.

Referring to FIGS. 7-9, an example panel assembly 300 (also referred to as a multilayer panel) suitable for use as the individual panel assemblies 214 will now be described. In the example three-way heat exchanger 200, all the panel assemblies 214 have substantially the same configuration as the panel assembly 300 shown in FIGS. 7-9. The panel assemblies 214 will be referred to as the panel assemblies 300 hereinafter for convenience of description. Some of or all the panel assemblies 214 may include additional components, fewer components, or other components than the panel assembly 300.

FIG. 7 is a right side elevation of the example panel assembly 300. FIG. 8 is an exploded view of the panel assembly 300. FIG. 9 is a schematic section of the panel assembly 300 taken along section line 9-9 in FIG. 7. The spatial relation of components of the panel assembly 300 will be described with respect to the X-axis, Y-axis, and Z-axis, and the lateral direction, longitudinal direction, and vertical direction defined by the three-way heat exchanger 200. The panel assembly 300 will also be described in the orientation when implemented and installed in the three-way heat exchanger 200. Directional terms are used to describe components of the panel assembly 300 solely for convenience of description. The examples shown and described are not limited to any particular orientation.

The panel assembly 300 includes a frame 302 that defines first and second vertical ends 304 and 306, in the Z-axis, first and second lateral faces 305 and 307, in the X-axis, and first and second longitudinal ends 308 and 310, in the Y-axis, of the panel assembly 300. The frame 302 includes opposite first and second header sections 312 and 314 respectively located at the first and second vertical ends 304 and 306. The frame 302 also includes a middle section 316 between the opposite header sections 312 and 314. The header sections 312 and 314 respectively define liquid desiccant header areas 320 and 322. The middle section 316 defines a heat transfer fluid area 324. The liquid desiccant header areas 320 and 322 are separated from the heat transfer fluid area 324 by portions (not labeled) of the frame 302 (or "frame bars") that respectively extend between the heat transfer fluid area 324 and one of the liquid desiccant header areas 320 and 322. The middle section 316 defines a leading edge and a trailing edge of the frame 302. The leading edge extends between the header sections 312, 314 proximate the first longitudinal end 308, and the trailing edge extends between the header sections 312, 314 proximate the second longitudinal end 310. The leading edge and/or the trailing edge may include aerodynamic features that facilitate controlling a pressure drop and/or reducing drag of the air flowing through the airflow gaps 216. Example aerodynamic features are described in U.S. patent application Ser. No. 18/390,941, titled "LIQUID DESICCANT AIR CONDITIONER MODULES HAVING AERODYNAMIC FEATURES," filed Dec. 20, 2023, the disclosure of which is incorporated by reference in its entirety.

Each header section 312, 314 of the frame 302 includes complementing airflow restrictor members 388, 390 (FIGS. 12-18). A first airflow restrictor member 388 of each header section 312, 314 is located on the first lateral face 305 of the frame 302. A second airflow restrictor member 390 of each header section 312, 314 is located on the second lateral face 307 of the frame 302. When the heat exchanger 200 is assembled with the airflow gaps 216 defined between adjacent panel assemblies 300, the first airflow restrictor members 388 of the panel assembly 300 cooperate or engage with the second airflow restrictor members 390 of the adjacent panel assembly 300 to form airflow restrictors 392 (see FIGS. 16-18) located in the airflow gap 216 between the adjacent panel assemblies. The airflow restrictors 392 define a tortuous path in the airflow gap 216 for the inlet air stream in a direction other than the airflow direction (e.g., in the vertical direction). The liquid desiccant area 320 of the first header section 312 is located inboard (e.g., vertically below) the airflow restrictor members 388, 390 of the first header section 312. The liquid desiccant area 322 of the second header section 314 is located inboard (e.g., vertically above) the airflow restrictor members 388, 390 of the second header section 314. As a result, the heat transfer fluid area 324 and both liquid desiccant header areas 320, 322 of each adjacent panel assemblies 300 are located between the airflow restrictors 392 located in the airflow gap 216. The airflow restrictor members 388, 390 and airflow restrictors 392 will be described further below with reference to FIGS. 12-18.

The panel assembly 300 also includes first and second plates 326 and 328 disposed on opposite lateral faces of the frame 302, covering the middle section 316 of the frame 302. The first and second plates 326 and 328 be a sheet of material that is, for example, less than 0.5 inch thick, or less than 0.25 inch thick, and the plates 326, 328 may also be referred to as "heat exchange sheets" or "sheets." The first and second plates 326 and 328 may be attached to the frame 302 or may be made integral with the frame 302. Suitable techniques for attaching the plates 326 and 328 to the frame 302 may include, for example, welding (e.g., laser, induction, or radio-frequency welding), adhesive bonding, thermal bonding, or another suitable technique for joining materials together. Additional detail on attaching the plates 326 and 328 to the frame 302 is described, for example, in U.S. Pat. No. 11,022,330, issued on Jun. 1, 2021, U.S. Pat. No. 10,921,001, issued on Feb. 16, 2021, and U.S. patent application Ser. No. 18/390,475, titled "SYSTEMS AND METHODS FOR ASSEMBLING LIQUID DESICCANT AIR CONDITIONER PANELS USING FLEXIBLE ALIGNMENT FEATURES," filed Dec. 20, 2023, the disclosures of which are incorporated by reference in their entirety.

The frame 302 and the plates 326 and 328 may be made from dissimilar but compatible materials for welding together. For example, the frame 302 and the plates 326 and 328 may each be made from the same or different thermoplastic or polymer materials. The frame 302 may be made, for example, from a thermoplastic or polymer using an injection molding process. The plates 326, 328 may be made, for example, from a thermoplastic or polymer using a thermoforming process and/or by die cutting. The material used for the frame 302 and the plates 326 and 328 may also be selected based on its compatibility with the liquid desiccant used in the three-way heat exchanger 200. Suitable polymer materials for the frame 302 and the plates 326 and 328 include, for example, polyolefins (e.g., polypropylene and/or polyethylene), acrylonitrile butadiene styrene (ABS), and combinations thereof. The plates 326 and 328 may include additives that improve properties such as laser-absorbing and conductivity properties, as well as the strength and/or stiffness of the plates 326 and 328. In other examples, the frame 302 and the plates 326 and 328 may be made from any other suitable materials that enable the three-way heat exchanger 200 to function as described.

The sheets or plates 326 and 328 envelop and seal the heat transfer fluid area 324 of the frame, defining a heat transfer fluid channel 330 of the panel assembly 300 between the plates 326 and 328 (see FIG. 9). As described below, in an example operation of the three-way heat exchanger 200, heat transfer fluid flows between the plates 326 and 328 through the heat transfer fluid channel 330 and liquid desiccant flows over an outer surface of the plates 326 and 328, opposite the heat transfer fluid channel 330. The plates 326 and 328 isolate the liquid desiccant from the heat transfer fluid in the channel 330, and allow heat to transfer between the liquid desiccant and the heat transfer fluid. The plates 326 and 328 may extend over one or both of liquid desiccant header areas 320 and 322 and define openings (e.g., apertures 360) that align with the one or both of the liquid desiccant header areas 320 and 322 to enable liquid desiccant to flow therethrough. In the example panel assembly 300, each of the plates 326 and 328 includes a series of apertures 360 located adjacent the liquid desiccant header 320 and a series of apertures 362 located adjacent the liquid desiccant header area 322. Liquid desiccant may flow through the apertures 360 and 362 of each plate 326 and 328 to enter and/or exit the liquid desiccant header area 320 and 322, respectively.

A netting or mesh (not shown) may be disposed in the heat transfer fluid channel 330 to maintain a width of the heat transfer fluid channel under negative pressure. The netting or mesh may also facilitate more constant flow rates of the heat transfer fluid through the channel 330. The netting or mesh may also facilitate improving flow distribution of the heat transfer fluid between the panel assemblies 300 in the three-way heat exchanger 200. The netting or mesh may also provide turbulation of the heat transfer fluid to increase heat transfer with the liquid desiccant flowing over the outer surfaces of the sheets or plates 326 and 328. A wide variety of materials may be used for the netting or mesh. For example, the netting or mesh may include the same polymer material as the plates (e.g., polyolefins, ABS, or combinations thereof). Alternatively, a flow guide (not shown) may be disposed in the heat transfer fluid channel 330. Example flow guides are described in U.S. patent application Ser. No. 18/585,344, titled "THREE-WAY HEAT EXCHANGE MODULE WITH CONTROLLED FLUID FLOW," filed Feb. 23, 2024, the disclosure of which is incorporated by reference in its entirety.

Referring again to FIGS. 7-9, the panel assembly 300 also includes membranes 332 and 334 disposed on the opposite lateral faces 305 and 307 of the frame 302. In other examples, only one of the membranes 332 or 334 may be included in the panel assembly 300. The membranes 332 and 334 cover the outer surfaces of the sheets or plates 326 and 328. As shown in FIG. 9, liquid desiccant channels 336 and 338 are respectively defined between the membrane 332 and the plate 326 and the membrane 334 and the plate 328. The membranes 332 and 334 also envelop and seal the liquid desiccant header areas 320 and 322. Each liquid desiccant channel 336 and 338 connects the liquid desiccant header areas 320 and 322 in fluid communication. As described below, in an example operation of the three-way heat exchanger 200, liquid desiccant flows through one of the liquid desiccant header areas 320 or 322, into the liquid desiccant channels 336 and 338, over the outer surfaces of the plates 326 and 328 and behind the membranes 332 and 334, and finally into the other one of the liquid desiccant header areas 320 or 322. The plates 326 and 328 limit contact between the liquid desiccant flowing in the liquid desiccant channels 336 and 338 and heat transfer fluid flowing through the heat transfer fluid channel 330, and enable heat to transfer therebetween. In examples where only one of the membranes 332 or 334 is included in the panel assembly 300, only one liquid desiccant channel 336 or 338 may be defined between the membrane 332 or 334 and the plate 326 or 328. In these examples, the plate 326 or 328 on the lateral face 305 or 307 opposite the liquid desiccant channel 336 or 338 may envelop and seal the liquid desiccant header areas 320 and 322 and restrict flow of liquid desiccant opposite the liquid desiccant channel 336 or 338.

The membranes 332 and 334 are attached to one of the lateral faces 305 and 307, respectively, of the frame 302 to envelop and seal the liquid desiccant header areas 320 and 322. The membranes 332 and 334 may additionally and/or alternatively be attached to the outer surface of the respective sheet or plate 326 and 328, which may facilitate maintaining a width of the liquid desiccant channels 336 and 338 and/or limiting a propensity of the membranes 332 and 334 to bulge outward when liquid desiccant flows through the liquid desiccant channels 336 and 338. The membranes 332 and 334 may be attached to the lateral faces 305 and 307 of the frame 302 and/or the outer surfaces of the plates 326 and 328 using any suitable technique, such as adhesive bonding, heat sealing, or welding, for example. The membranes 332 and 334 may be respectively attached to the plates 326 and 328 directly by heat sealing or welding where compatible materials (e.g., polyolefins) are used for the membranes 332 and 334 and the respective plates 326 and 328. An outer bonding layer (not shown) may be applied over the outer surfaces of the plates 326 and 328 to improve the quality or ease of forming the heat seals or welds with the respective membranes 332 and 334. The outer surfaces of the plates 326 and 328 may include raised patterns or dot features (not shown) to which the membranes 332 and 334 are adhered, heat sealed, or otherwise attached. The raised patterns may be formed on the frame 302 and/or plates 326 and 328 by thermoforming, embossing, or other suitable techniques. Attaching the membranes 332 and 334 to the dot features or raised patterns may provide an additional advantage of facilitating uniform distribution of the liquid desiccant across the liquid desiccant channels 336 and 338 in the longitudinal direction and reducing stresses that can lead to warping of the plates 326 and 328. Warping of the plates 326 and 328 may degrade the ability to transfer heat and moisture between the heat transfer fluid, the liquid desiccant, and air that flows across the membranes 332 and 334 in an example operation of the three-way heat exchanger 200. Additional detail on example systems and methods for attaching the membranes 332 and 334 to the frame 302 and the respective sheets or plates 326 and 328 is described, for example, in U.S. Pat. No. 11,022,330, issued on Jun. 1, 2021, U.S. Pat. No. 10,921,001, issued on Feb. 16, 2021, and U.S. patent application Ser. No. 18/390,475, titled "SYSTEMS AND METHODS FOR ASSEMBLING LIQUID DESICCANT AIR CONDITIONER PANELS USING FLEXIBLE ALIGNMENT FEATURES," filed Dec. 20, 2023, the disclosures of which are incorporated by reference in their entirety.

The membranes 332 and 334 are made of a vapor-permeable material that permits transfer of water vapor therethrough to enable liquid desiccant flowing in the liquid desiccant channels 336 and 338 to absorb moisture from and desorb moisture into air flowing across the membranes 332 and 334. In some examples, the membranes 332 and 334 may each be made from a polypropylene material or other suitable vapor-permeable polymer material. The vapor-permeable material used for the membranes 332 and 334 may be microporous (e.g., having a pore size less than 0.5 micrometers ($\mu$m)). Examples of suitable microporous membranes are disclosed in U.S. Pat. No. 9,101,874, issued on Aug. 11, 2015, the disclosure of which is hereby incorporated by reference herein in its entirety. By way of example, suitable commercially available membrane include the EZ2090 polypropylene, microporous membrane from Celgard. Microporous membranes 332 and 334 may have 40-80% open area, pore sizes of less than 0.5 $\mu$m, and a thickness of less than 100 $\mu$m. Some example microporous membranes may have greater than 80% open area. One suitable membrane is approximately 65% open area and has a thickness of approximate 20 $\mu$m. This type of membrane is structurally very uniform in pore size and is thin enough to not create a significant thermal barrier. Other possible membranes include membranes from 3M, Lydall, and other manufacturers. The membranes 332 and 334 may include any suitable vapor-permeable material that permits water transfer therethrough to enable the liquid desiccant in the liquid desiccant channels 336 and 338 to absorb moisture from or desorb moisture into air flowing over the membranes 332 and 334.

The frame 302 defines a liquid desiccant inlet port 340 that feeds liquid desiccant into the liquid desiccant header area 320 and a liquid desiccant outlet port 342 that receives liquid desiccant from the liquid desiccant header area 322. The liquid desiccant inlet port 340 is defined in a first corner flange 364 of the frame 302. The first corner flange 364 of the frame 302 is part of the first header section 312 and is located adjacent to the liquid desiccant header area 320 at the first vertical end 304 and the second longitudinal end 310 of the panel assembly 300. The liquid desiccant outlet port 342 is defined in a second corner flange 366 of the frame 302. The second corner flange 366 is part of the second header section 314, and is located adjacent to the liquid desiccant header area 322 at the second vertical end 306 and the first longitudinal end 308 of the panel assembly 300. Thus, the first and second corner flanges 364 and 366, and the liquid desiccant inlet and outlet ports 340 and 342 respectively defined therein, are located on opposite longitudinal and vertical ends of the panel assembly 300.

As represented by the flow lines 344 in FIGS. 7 and 9, in an example operation of the three-way heat exchanger 200, liquid desiccant is supplied into the liquid desiccant header area 320 of the panel assembly 300 via the liquid desiccant inlet port 340, flows through each of the liquid desiccant channels 336 and 338 and into the liquid desiccant header area 322, and exits the panel assembly 300 via the liquid desiccant outlet port 342. In the illustrated example, the liquid desiccant flows vertically downward in the desiccant channels 336, 338. The liquid desiccant may have alternative flow directions. The flow direction(s) of the liquid desiccant in the channels 336, 338 may vary depending, for example, on the orientation of the panel assemblies 300 in the heat exchanger 200, location of the liquid desiccant inlet and outlet ports 340, 342, and/or to which liquid desiccant header area 320, 322 the liquid desiccant is supplied and from which header area the liquid desiccant exits.

The frame 302 also defines a heat transfer fluid inlet port 346 that feeds heat transfer fluid into the heat transfer fluid channel 330 and a heat transfer fluid outlet port 348 that receives heat transfer fluid from the heat transfer fluid channel 330. The heat transfer fluid inlet port 346 is defined in a third corner flange 368 of the frame 302. The third corner flange 368 of the frame 302 is part of the second header section 314 and the middle section 316. The third corner flange 368 is located adjacent to heat transfer fluid channel 330, at the second longitudinal end 310 and proximate to the second vertical end 306 of the panel assembly 300. The heat transfer fluid outlet port 348 is defined in a fourth corner flange 370 of the frame 302. The fourth corner flange 370 is part of the first header section 312 and the middle section 316. The fourth corner flange 370 is located adjacent to the heat transfer fluid channel 330, at the first longitudinal end 308 and proximate to the first vertical end 304 of the panel assembly 300. Thus, the third and fourth corner flanges 368 and 370, and the heat transfer fluid inlet and outlet ports 346 and 348 respectively defined therein, are located on opposite longitudinal and vertical ends of the panel assembly 300. Additionally, the first and fourth corner flanges 364 and 370, and the liquid desiccant inlet port 340 and the heat transfer fluid outlet port 348 respectively defined therein, are both located proximate to the first vertical end 304, on opposite longitudinal ends of the panel assembly. The second and third corner flanges 366 and 368, and the liquid desiccant outlet port 342 and the heat transfer fluid inlet port 346 respectively defined therein, are both located proximate to the second vertical end 306, on opposite longitudinal ends of the panel assembly.

As represented by the flow lines 350 in FIGS. 7 and 9, in an example operation of the three-way heat exchanger 200, heat transfer fluid is supplied into the heat transfer fluid channel 330 of the panel assembly 300 via the heat transfer fluid inlet port 346, flows therethrough, and exits the panel assembly 300 via the heat transfer fluid outlet port 348. In the illustrated example, the heat transfer fluid flows vertically upward in the channel 330. The heat transfer fluid may have alternative flow directions. The flow direction(s) of the heat transfer fluid in the channel 330 may vary depending, for example, on the orientation of the panel assemblies 300 in the heat exchanger 200, location of the heat transfer fluid inlet and outlet ports 346, 348, and/or through which port 346, 348 the heat transfer fluid enters the channel 330 and through which port the heat transfer fluid exits the channel 330.

Figure 10A:
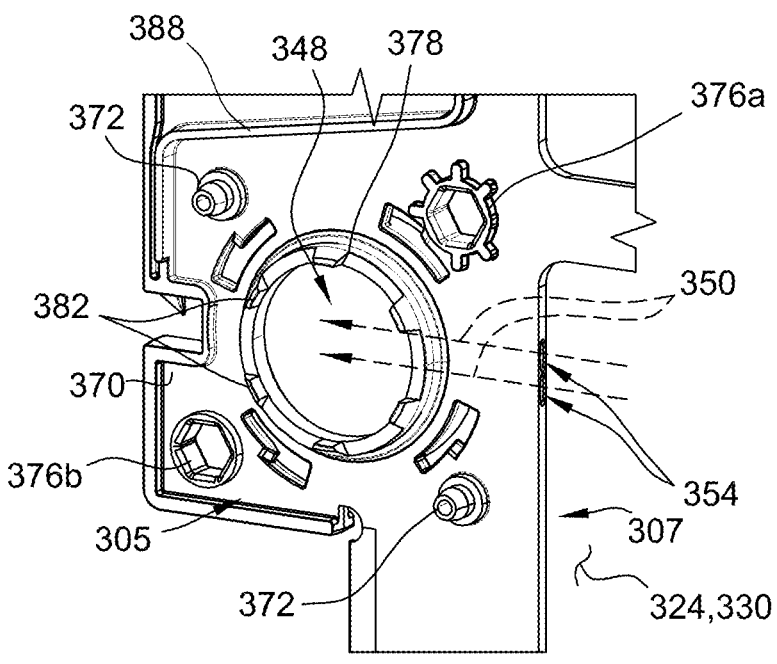
FIGS. 10A-10D are enlarged views of the sections A, B, C, and D, respectively, shown in FIG. 8.
Figure 10B:
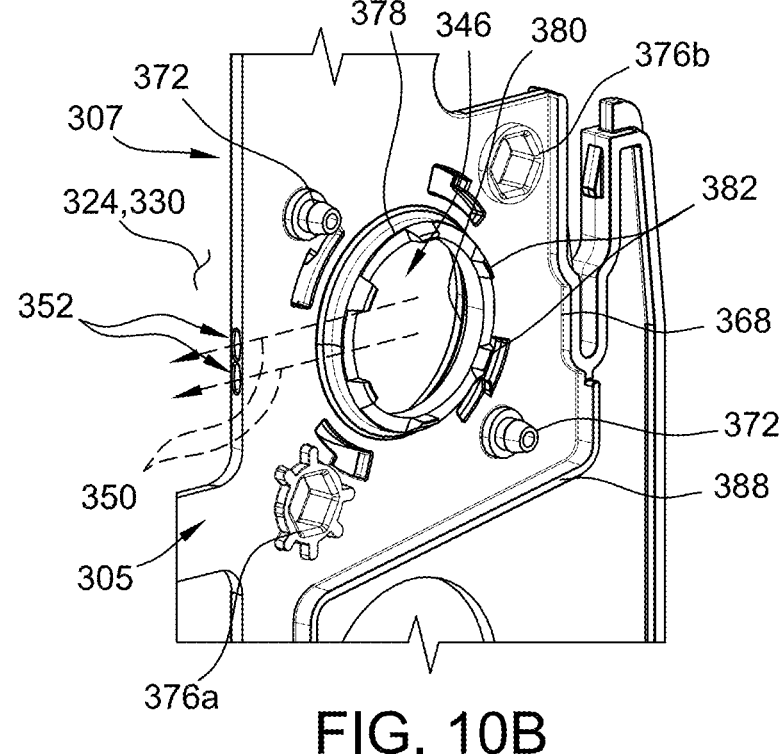

FIGS. 10A-10D are enlarged views of the sections A, B, C, D, respectively, of the frame 302 shown in FIG. 8, and depict the corner flanges 364-370 in greater detail. In particular, FIGS. 10A-10D show microchannels or apertures that provide fluid connection between the ports 340, 342, 346, and 348 and the respective fluid areas defined in the panel assembly 300. As shown in FIGS. 10A and 10B, the heat transfer fluid inlet port 346 is connected to the heat transfer fluid area 324 by apertures 352 (FIG. 10B) and the heat transfer fluid outlet port 348 is connected to the heat transfer fluid area 324 by apertures 354 (FIG. 10A). The heat transfer fluid area 324 defines the heat transfer fluid channel 330 when sealed on the opposite lateral faces 305 and 307 of the frame 302 by the plates 326 and 328. As indicated by the flow lines 350 in FIGS. 10A and 10B, heat transfer fluid enters the heat transfer fluid channel 330 from the inlet port 346 via the apertures 352 and exits the channel 330 into the outlet port 348 via the apertures 354.

Figure 10C:
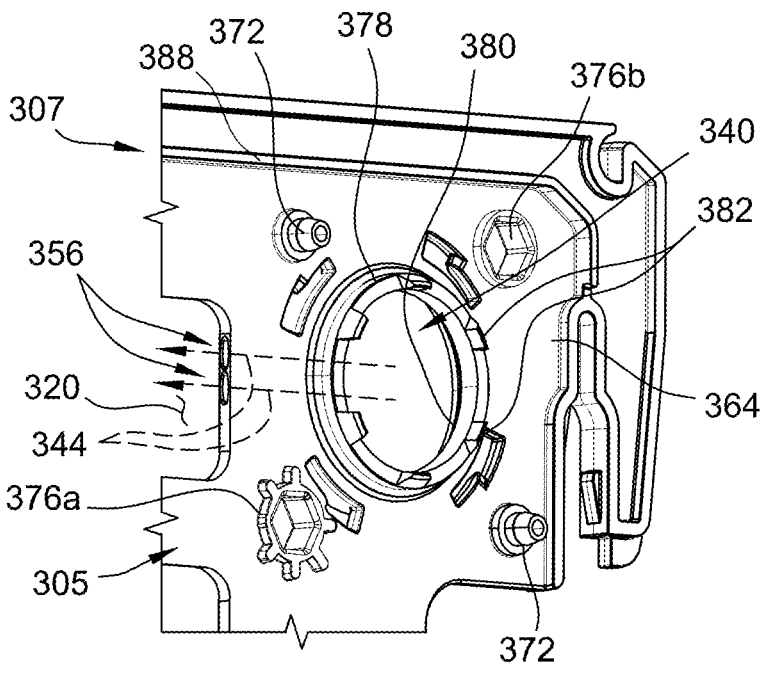
Figure 10D:
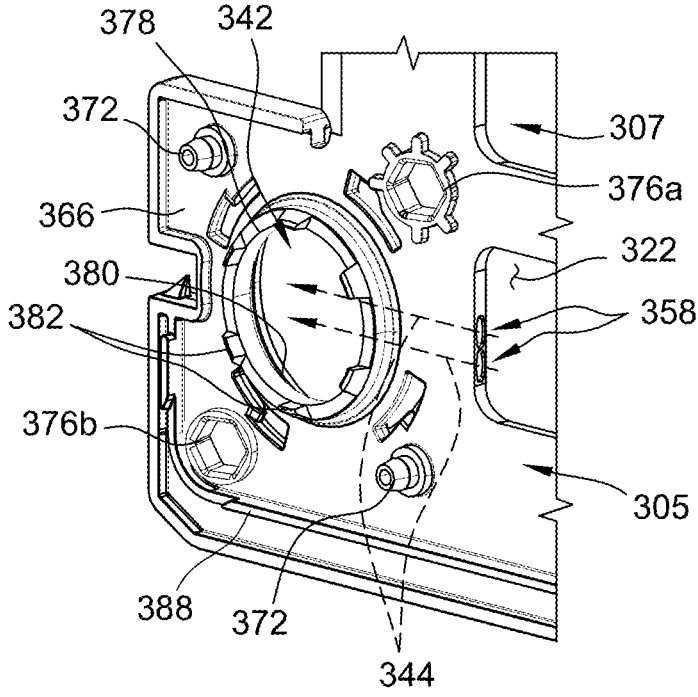

As shown in FIGS. 10C and 10D, the liquid desiccant inlet port 340 is connected to the first liquid desiccant header area 320 by apertures 356 (FIG. 10C) and the liquid desiccant outlet port 342 is connected to the second liquid desiccant header area 322 by apertures 358 (FIG. 10D). As indicated by the flow lines 344 in FIGS. 10C and 10D, liquid desiccant enters the first liquid desiccant header area 320 from the inlet port 340 via the apertures 356, flows into and through the liquid desiccant channels 336 and 338 (FIG. 9), into the second liquid desiccant header area 322, and exits the header area 322 into the outlet port 342 via the apertures 358. In the illustrated example of FIGS. 10A-10D, each of the apertures 352-358 include two apertures. Any suitable number of apertures may be used for the apertures 352-358. In some examples, a greater number of apertures may be used for some of the apertures 352-358 than the other apertures 352-358. The number, size, and/or shape of the apertures 352-358 may be the same or different. The number of apertures, as well as the size and shape, used for each of the apertures 352-358 may also vary between panel assemblies 300.

FIGS. 10A-10D also show example features of the panel assembly 300 that may facilitate connecting adjacent panel assemblies 300 together when installed in the three-way heat exchanger 200. For example, when panel assemblies 300 are arranged in series and installed in the heat exchanger 200, the corner flanges 364-370 of the frames 302 of adjacent panel assemblies 300 may be connected. As shown, each corner flange 364-370 includes one or more snap fittings 372. The snap fittings 372 extend in the lateral direction from the first lateral face 305 of the frame 302, and a corresponding bore 374 (shown in FIG. 6) depends into the second lateral face 307 at the location laterally opposite the snap fitting 372. Each corner flange 364-370 includes two snap fittings 372 and corresponding bores 374 in the illustrated example. In other examples, more or fewer snap fittings 372 and corresponding bores 374 may be included at the corner flanges 364-370. The corner flanges 364-370 may include the same or a different number of snap fittings 372 and corresponding bores 374. Suitably, a corresponding bore 374 is included for each snap fitting 372 in each corner flange 364-370. When the panel assemblies 300 are arranged in series and installed in the heat exchanger 200, each snap fitting 372 of the corner flanges 364-370 of the frame 302 of one of the panel assemblies 300 is received by one of the corresponding bores 374 of the corner flanges 364-370 of the frame 302 of a laterally adjacent panel assembly 300 to directly connect adjacent panel assemblies 300.

Each corner flange 364-370 also includes one or more alignment holes 376 extending therethrough in the lateral direction. In the illustrated embodiment, the corner flanges 364-370 each include two alignment holes 376, labeled in FIGS. 10A-D as a first alignment hole 376a and a second alignment hole 376b. The first alignment holes 376a of each corner flange 364-370 are located longitudinally inboard of the second alignment holes 376b and adjacent to respective corners of the heat transfer fluid area 324. In other examples, more or fewer alignment holes 376 may be included at the corner flanges 364-370. The corner flanges 364-370 may include the same or a different number of alignment holes 376. When the panel assemblies are arranged in series and installed in the heat exchanger 200, the alignment holes 376 of the corner flanges 364-370 of the frames 302 of the panel assemblies 300 receive a corresponding clamping assembly (not shown) used to clamp the panel assemblies 300 together. The first alignment holes 376a of the panel assemblies 300 correspond to one of the alignment apertures 258 of the first end plate 218 and one of the alignment apertures 260 of the second end plate 220 (shown in FIGS. 2 and 4). The second alignment holes 376b receive a corresponding clamping assembly (not shown). The second alignment holes 376b do not correspond to alignment apertures 258 and 260 in the end plates 218 and 220, such that the clamping assemblies received by the second alignment holes 376b extend through the panel assemblies 300 but not the end plates 218 and 220.

Still referring to FIGS. 10A-10D, each of the corner flanges 364-370 includes flange collar 378 circumscribing the respective fluid port 340, 342, 346, 348 defined in the corner flange. The flange collars 378 extend in the lateral direction from the first lateral face 305 of the frame 302. Each corner flange 364-370 also includes a corresponding grooved mouth 380 that depends into the second lateral face 307 and circumscribes the respective fluid port 340, 342, 346, 348 at the location laterally opposite the flange collar 378. When the panel assemblies 300 are arranged in series and installed in the heat exchanger 200, each flange collar 378 of the corner flanges 364-370 of the frame 302 of one of the panel assemblies 300 is received by one of the corresponding grooved mouths 380 of the corner flanges 364-370 of the frame 302 of a laterally adjacent panel assembly 300 to directly connect adjacent panel assemblies 300. The flange collars 378 each include a set of piloting teeth 382 that facilitate aligning the flange collars 378 with the corresponding grooved mouths 380 and inserting the flange collars 378 therein. The piloting teeth 382 may include a piloting feature (e.g., a chamfer) for easier insertion of the teeth and the flange collar 378 into the corresponding grooved mouth 380. Elastomeric seals (not shown), such as an O-ring, may be seated within each of the grooved mouths 380 and to create a fluid-tight seal between the adjacent panel assemblies 300 at the adjacent fluid ports 340, 342, 346, 348 when the flange collars 378 are inserted into the grooved mouths 380.

Figure 6:
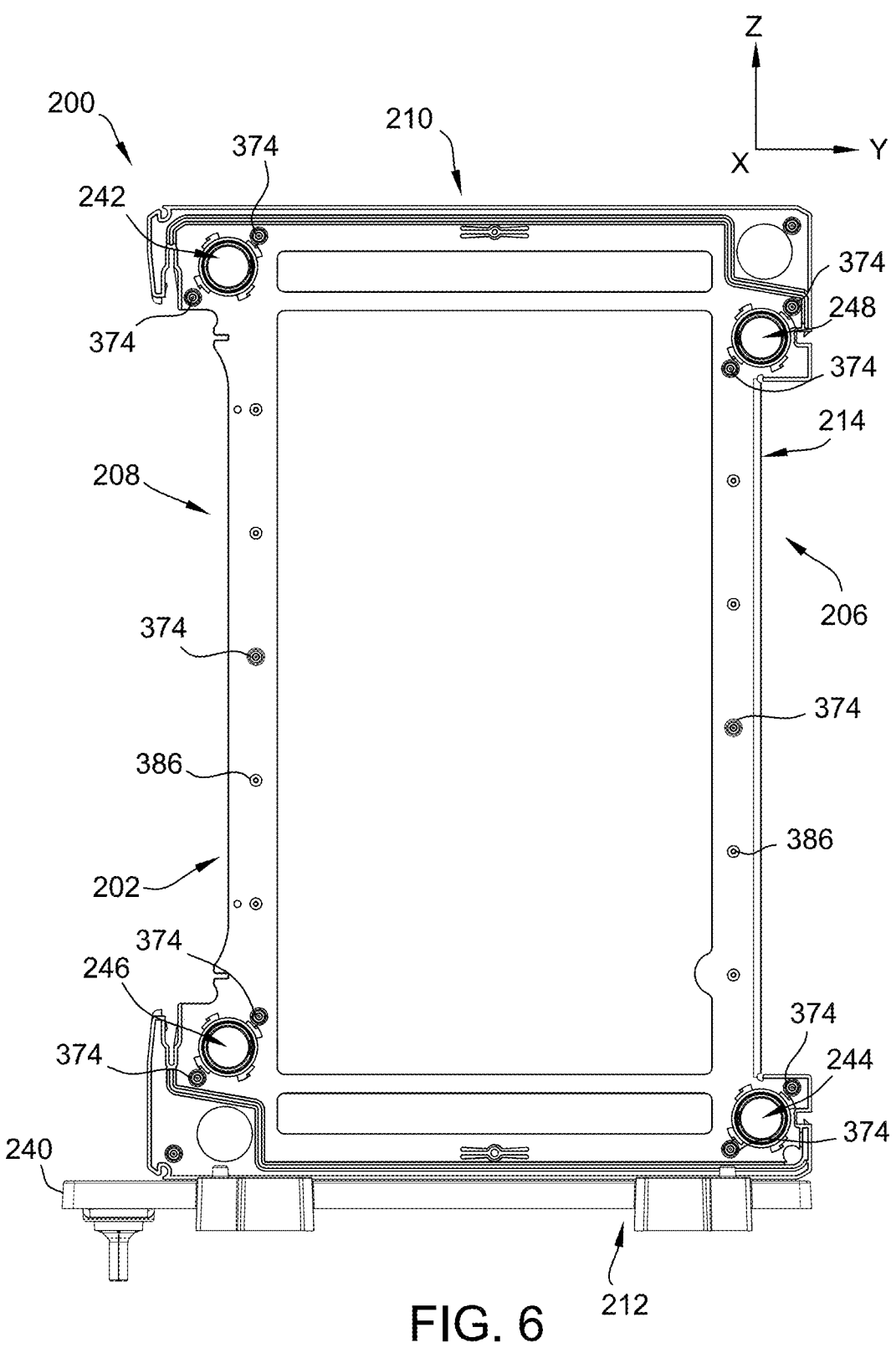
FIG. 6 is a left side elevation of the three-way heat exchanger with various components omitted, similar to FIGS. 3 and 5.

With additional reference to FIGS. 3 and 5, and to FIG. 6 which shows a left elevation of the three-way heat exchanger 200 with various components omitted similar to FIGS. 3 and 5, the panel assemblies 300 are arranged in succession or series in the lateral direction as described above. In FIGS. 3, 5, and 6, the plates 326 and 328 and the membranes 332 and 334 are omitted for convenience of illustration. When assembled and installed in the three-way heat exchanger 200, for each pair of adjacent panel assemblies 300, the membrane 332 of one of the panel assemblies 300 faces the membrane 334 of the other one of the panel assemblies 300. The airflow gaps 216 are defined between the adjacent membranes 332 and 334. Each panel assembly 300 may have a reduced width over the middle section 316 (see FIG. 13), such that the panel assemblies 300 are spaced apart over their adjacent middle sections 316 to define the airflow gaps 216. Additionally and/or alternatively, the airflow gaps 216 may be defined and maintained by standoffs or spacers 386 between the middle sections 316 of adjacent panel assemblies 300. The standoffs or spacers 386 extend in the lateral direction outward from the middle section 316 proximate the longitudinal ends 308 and 310. The middle section 316 of each frame 302 may additionally and/or alternatively include the snap fittings 372 and the corresponding bores 374 (as shown in FIGS. 6 and 7) proximate the longitudinal ends 308 and 310. The snap fittings 372 and corresponding bores 374 located on the middle section 316 of the frame 302 may facilitate connecting adjacent panel assemblies 300 at the adjacent middle sections. The snap fittings 372 and corresponding bores 374 may be included in addition to the spacers 386. Alternatively, the spacers 386 may in some examples be the snap fittings 372 which engage the bores 374 of the adjacent panel assembly 300 to connect the adjacent panel assemblies and maintain the width of the airflow gaps 216.

The panel assemblies 300 are arranged in the three-way heat exchanger 200 such that, for each panel assembly, the first and second lateral faces 305 and 307 of the frame 302 are respectively oriented toward the first and second lateral sides 202 and 204 of the three-way heat exchanger 200. The first and second longitudinal ends 308 and 310 are respectively located at the first and second longitudinal sides 206 and 208 of the three-way heat exchanger 200, and the first and second vertical ends 304 and 306 are respectively located at the first and second vertical sides 210 and 212 of the three-way heat exchanger 200. The leading edges of the frames 302, located proximate the first longitudinal ends 308, are proximate the airflow inlet 224. The trailing edges of the frames 302, proximate the second longitudinal ends 310, are proximate the airflow outlet 226.

The ports 340, 342, 346, and 348 of the panel assemblies 300 align to define respective manifolds of the three-way heat exchanger 200 extending in the lateral direction through which heat transfer fluid and liquid desiccant flow to and from the panel assemblies 300 between the first and second lateral sides 202 and 204. The liquid desiccant inlet ports 340 of the panel assemblies 300 align to form a liquid desiccant inlet manifold 242 that extends between the first and second lateral sides 202 and 204 proximate to the first vertical side 210 and the second longitudinal side 208 of the three-way heat exchanger 200. The liquid desiccant outlet ports 342 of the panel assemblies 300 align to form a liquid desiccant outlet manifold 244 that extends between the first and second lateral sides 202 and 204 proximate to the second vertical side 212 and the first longitudinal side 206 of the three-way heat exchanger 200. The heat transfer fluid inlet ports 346 of the panel assemblies 300 align to form a heat transfer fluid inlet manifold 246 that extends between the first and second lateral sides 202 and 204 proximate to the second vertical side 212 and the second longitudinal side 208 of the three-way heat exchanger 200. The heat transfer fluid outlet ports 348 of the panel assemblies 300 align to form a heat transfer fluid outlet manifold 248 that extends between the first and second lateral sides 202 and 204 proximate to the first vertical side 210 and the first longitudinal side 206 of the three-way heat exchanger 200.

The panel assemblies 300 may include O-rings or other elastomeric sealing members that form liquid-tight seals between the aligning ports 340, 342, 346, and 348 of the adjacent panel assemblies to prevent fluid from leaking out of the respective manifolds 242-248. For example, as described above, elastomeric seals (not shown), such as an O-ring, may be seated within each of the grooved mouths 380 and to create a fluid-tight seal between the adjacent panel assemblies 300 at the adjacent fluid ports 340, 342, 346, 348 when the flange collars 378 are inserted into the grooved mouths 380. In some examples, the elastomeric seals 384 are radial seals (e.g., radial O-ring seals). Moreover, in each of the corner flanges 364-370, the snap fittings 372, corresponding bores 374, and the alignment holes 376 collectively surround the fluid port 340, 342, 346, 348 defined in the corner flange, which may facilitate creating and maintaining a fluid-tight seal between the adjacent ports 340, 342, 346, 348 that define the manifolds 242-248.

As shown in FIGS. 3 and 5, conduits 250, 252, 254, and 256 are used to fluidly connect the heat transfer fluid inlet 232 and outlet 234 and the liquid desiccant inlet 236 and outlet 238 to a respective manifold for heat transfer fluid and liquid desiccant entering and exiting the three-way heat exchanger 200. The liquid desiccant inlet 236 is fluidly connected to the liquid desiccant inlet manifold 242 by the conduit 250. The liquid desiccant outlet 238 is fluidly connected to the liquid desiccant outlet manifold 244 by the conduit 252. The heat transfer fluid inlet 232 is fluidly connected to the heat transfer fluid inlet manifold 246 by the conduit 254. The heat transfer fluid outlet 234 is fluidly connected to the heat transfer fluid outlet manifold 248 by the conduit 256. The conduits 250-256 may include any suitable fluid conduit (rigid and/or flexible) that enables heat transfer fluid and liquid desiccant to flow between the respective inlet and outlet and manifold, including, for example and without limitation, pipes, hoses, tubes, and combinations thereof. Each conduit 250-256 may be attached to the respective manifold 242-248 by coupling an end of the conduit to an end panel assembly 300 (i.e., the panel assembly 300 immediately adjacent to the lateral side 202 or 204) at the appropriate one of the ports 340, 342, 346, and 348. The conduits 250-256 may be attached to the appropriate port 340, 342, 346, and 348 of an end panel assembly 300 using any suitable means, include fasteners, threads, clamps, and the like.

The conduits 250 and 256 extend between the end plate 218 and the end panel assembly 300 at the first lateral side 202. The conduits 252 and 254 extend between the end plate 220 and the end panel assembly 300 at the second lateral side 204. The conduits 250 and 256 may extend through the end plate 218 to respectively define the inlet 236 or the outlet 234, may be coupled to the respective inlet 236 or outlet 234 that is defined by the end plate 218, or may be made integral with the end plate 218 and the respective inlet 236 or outlet 234 defined by the end plate 218. The conduits 252 and 254 may extend through the end plate 220 to respectively define the outlet 238 or the inlet 232, may be coupled to the respective outlet 238 or inlet 232 that is defined by the end plate 220, or may be made integral with the end plate 220 and the respective outlet 238 or inlet 232 defined by the end plate 220.

Each of the manifolds 242-248 may be closed at the lateral side 202 or 204 of the heat exchanger 200 opposite of the inlet or outlet to which the manifold is connected. The liquid desiccant inlet manifold 242 may be closed at the second lateral side 204, the liquid desiccant outlet manifold 244 may be closed at the first lateral side 202 opposite the liquid desiccant inlet manifold 242, the heat transfer fluid inlet manifold 246 may be closed at the first lateral side 202, and the heat transfer fluid outlet manifold 248 may be closed at the second lateral side 204 opposite the heat transfer fluid inlet manifold 246. The manifolds 242-248 may be closed at the respective lateral sides 202 or 204 by the end plate 218 or 220 (shown in FIGS. 2 and 4). In particular, the end plate 218 may plug the ports 342 and 346 of the panel assembly 300 at the end of the panel assemblies 300 that is adjacent to the first lateral side 202 to close the manifolds 244 and 246 at the first lateral side 202. The end plate 220 may plug the ports 340 and 348 of the panel assembly 300 at the end of the panel assemblies 300 that is adjacent to the second lateral side 204 to close the manifolds 244 and 246 at the second lateral side 204. Additionally and/or alternatively, end caps or plugs 272 and 274 (see FIG. 11) may be inserted into or otherwise disposed over the ports 342 and 346, respectively, of the panel assembly 300 adjacent to the first lateral side 202 to close the manifolds 244 and 246 at the first lateral side 202, and end caps or plugs 270 and 276 (see FIG. 11) may be inserted into or otherwise disposed over the ports 340 and 348, respectively, of the panel assembly 300 adjacent to the second lateral side 204 to close the manifolds 244 and 246 at the second lateral side 204.

Figure 11:
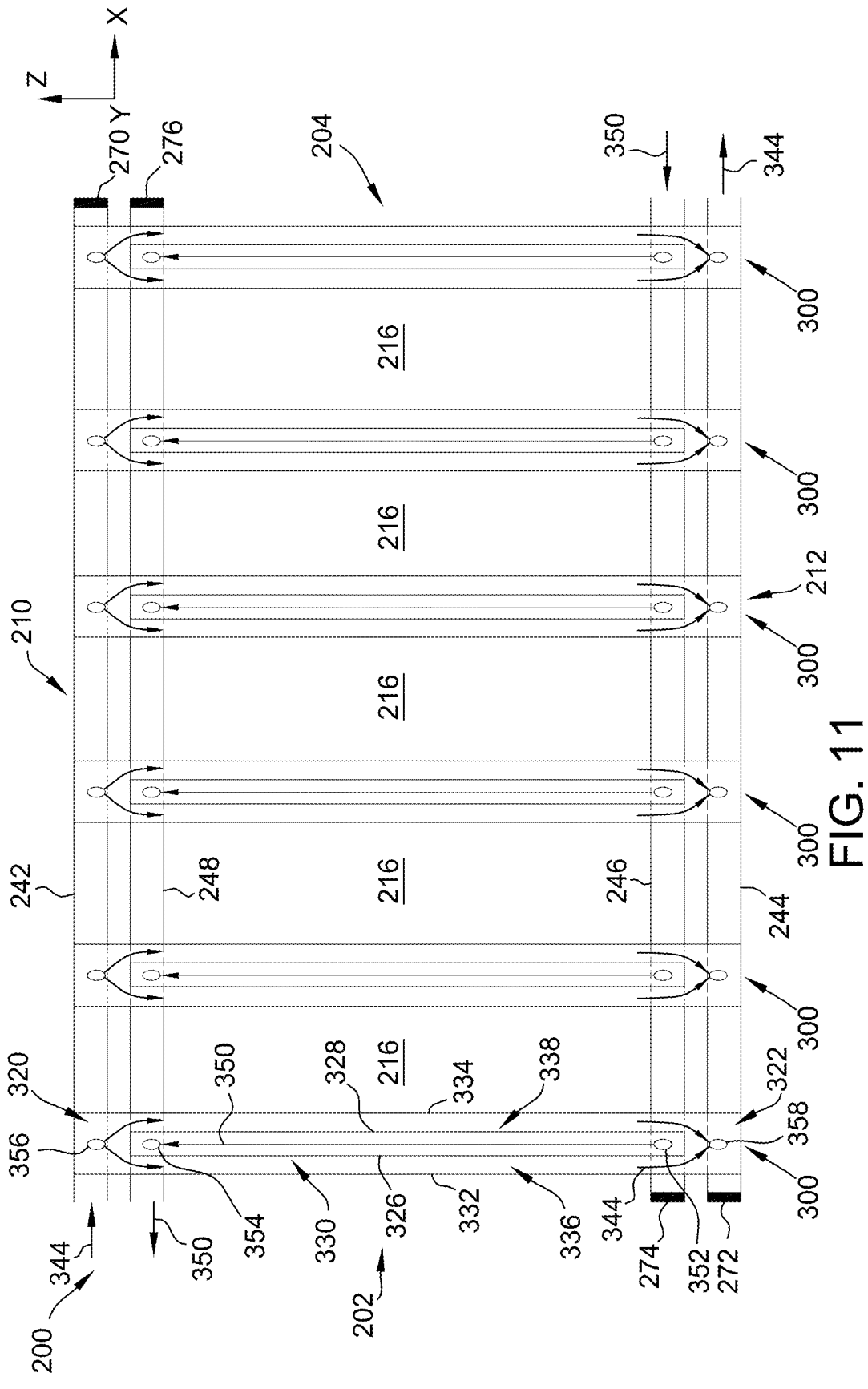
FIG. 11 is a schematic showing flow of liquid desiccant and heat transfer fluid through the three-way heat exchanger of FIGS. 2-6.

Referring now to FIG. 11, operation of the three-way heat exchanger 200 will now be described. FIG. 11 is a schematic showing an interior view of the three-way heat exchanger 200 to depict flow of liquid desiccant and the heat transfer fluid through the manifolds 242-248 and the panel assemblies 300. In the schematic of FIG. 11, panel assemblies 300 are depicted with features exaggerated and/or simplified for convenience of illustration and description.

In an example operation of the heat exchanger 200, an inlet air stream (e.g., the first or second inlet air stream 110 or 114 shown in FIG. 1) enters via the airflow inlet 224 and flows through the air gaps 216 defined between adjacent panel assemblies 300 in the airflow direction 278. The air flowing through the air gaps 216 is treated by liquid desiccant, indicated by the flow lines 344, and heat transfer fluid, indicated by the flow lines 350, that are channeled through each of the panel assemblies 300. In some operations, the liquid desiccant 344 is concentrated liquid desiccant 152 from the liquid desiccant circuit 108 and the heat transfer fluid 350 is conditioner heat transfer fluid from the conditioner sub-system 104 shown in FIG. 1, and the heat exchanger 200 is used to cool and dehumidify the air flowing through the air gaps 216. In other operations, the liquid desiccant 344 is diluted liquid desiccant 154 from the liquid desiccant circuit 108 and the heat transfer fluid 350 is regenerator heat transfer fluid from the regenerator sub-system 106 shown in FIG. 1, and the heat exchanger 200 is used to heat and reject moisture into the air flowing through the air gaps 216.

The liquid desiccant 344 flows into the liquid desiccant inlet manifold 242 from the first lateral side 202, via the liquid desiccant inlet 236 and the conduit 250 (shown in FIGS. 3-5). The liquid desiccant 344 enters into the liquid desiccant header area 320 of each panel assembly 300 from the liquid desiccant inlet manifold 242 via the apertures 356. In each panel assembly 300, the liquid desiccant 344 flows from the liquid desiccant header area 320, into the liquid desiccant channels 336 and 338 via the apertures 360 on each plate 326 and 328 (shown in FIGS. 7 and 8), downward through the liquid desiccant channels 336 and 338, and into the liquid desiccant header area 322 via the apertures 362 on each plate 326 and 328 (shown in FIGS. 7 and 8). As the liquid desiccant 344 flows behind the membranes 332 and 334 of the panel assemblies 300, the liquid desiccant 344 absorbs moisture from or desorbs moisture into the air flowing through the air gaps 216 adjacent to the membranes 332 and 334. Moisture is permitted to permeate through each of the membranes 332 and 334 to enable the moisture to transfer between the liquid desiccant 344 and air in the air gaps 216. The liquid desiccant 344, having absorbed or desorbed moisture, exits each panel assembly 300 from the respective liquid desiccant header area 322 via the apertures 358, and flows through the liquid desiccant outlet manifold 244 toward the second lateral side 204. The liquid desiccant 344 exits the heat exchanger 200 via the conduit 252 and the liquid desiccant outlet 238 (shown in FIG. 5).

The heat transfer fluid 350 flows into the heat transfer fluid inlet manifold 246 from the second lateral side 204, via the heat transfer fluid inlet 232 and the conduit 254 (shown in FIGS. 4 and 5). The heat transfer fluid 350 enters into each panel assembly 300 from the heat transfer fluid inlet manifold 246 via the apertures 352. In each panel assembly 300, the heat transfer fluid 350 flows upward through the heat transfer fluid channel 330. The heat transfer fluid 350 flowing through the channel 330 is in thermal communication with the liquid desiccant 344 flowing through the liquid desiccant channels 336 and 338. Heat is transferred between the heat transfer fluid 350 and the liquid desiccant 344 to remove heat from or reject heat into the air flowing through the air gaps 216, depending on the operating mode of the heat exchanger 200. The heat transfer fluid 350, having absorbed or rejected heat, exits each panel assembly 300 via the apertures 354, and flows through the heat transfer fluid outlet manifold 248 toward the first lateral side 202. The heat transfer fluid 350 exits the heat exchanger 200 via the conduit 256 and the heat transfer fluid outlet 234 (shown in FIGS. 3-5).

The direction of flow of the heat transfer fluid 350 and the liquid desiccant 344 in the illustrated embodiment is by way of example only, and may change in other embodiments of the heat exchanger 200. For example, the liquid desiccant 344 may flow upward through the desiccant channels 336 and 338 on the panel assemblies 300. In these examples, the direction of flow of the liquid desiccant 344 through the liquid desiccant inlet 236 and outlet 238 and the liquid desiccant inlet and outlet manifolds 242 and 244 would also be reversed. The heat transfer fluid 350 may flow downward through the heat transfer channels 330 of the panel assemblies 300. In these examples, the direction of flow of the heat transfer fluid 350 through the heat transfer fluid inlet and outlets 232 and 234 and the heat transfer fluid inlet and outlet manifolds 246 and 248 would also be reversed. The liquid desiccant 344 and the heat transfer fluid 350 flow in counter-flow relation in the illustrated example, but may flow in the same direction through the panel assemblies in alternative examples.

The inlet air stream entering via the airflow inlet 224 distributes into the airflow gaps 216 and flows therethrough in the airflow direction 278, and exits via the airflow outlet 226. The air stream may have the propensity to leak from the airflow gaps 216 in a direction other than the airflow direction 278 (e.g., in the vertical direction between the adjacent header sections 320 and/or the adjacent header sections 322 of the adjacent panel assemblies 300). This may negatively impact performance and/or efficiency of the heat exchanger 200. For example, leakage of the air between the panel assemblies may reduce the output of conditioned air exiting the heat exchanger 200. Leakage may be prevented by placing end plates above and/or below the panel assemblies 300 to vertically enclose the interior 222 of the heat exchanger 200, however a portion of the air stream in the airstream gaps 216 still may flow across areas of the panel assemblies where the heat transfer fluid and the liquid desiccant are not flowing (e.g., vertically above and/or below the heat transfer fluid channel 330 and the desiccant channels 336, 338). This allows for "dead space" in the airflow gaps 216, where the air contacts the "non-working" areas of the panel assemblies 300, lowering the efficiency of the heat exchanger 200. Additionally, and/or alternatively, the use of separate end plates above and/or below the panel assemblies 300 to prevent air leakage may increase material and labor costs associated with the manufacture and/or assembly of the heat exchanger 200.

Referring to FIGS. 12-18, the two airflow restrictors 392 are located in each airflow gap 216 between a pair of adjacent panel assemblies 300 to define a tortuous path in the airflow gap 216 for the inlet air stream in a direction other than the airflow direction (e.g., in the vertical direction). The airflow restrictors 392 facilitate reducing, inhibiting or eliminating the propensity for the inlet air stream to leak from between the adjacent panel assemblies 300. Thereby, output of the heat exchanger 200 of treated (e.g., conditioned) air flowing in the airflow direction and exiting via the airflow outlet 226 may be optimized. The airflow restrictors 392 are "sandwiched" between the adjacent panel assemblies 300 and located on opposite ends (e.g., opposite vertical ends) of the airflow gap 216. The airflow restrictors 392 are positioned outboard (e.g., vertically above or below) of the heat transfer fluid channels 330 and the desiccant channels 336 and 338 of the adjacent panel assemblies 300, which reduces any negative interference the airflow restrictors 392 may have on the contact between the air stream and the working areas of the panel assemblies 300. The airflow restrictors 392 extend in the airflow direction 278 (e.g., the longitudinal direction), one airflow restrictor 392 extending proximate the first vertical ends 304 of the adjacent panel assemblies 300 and one airflow restrictor 392 extending proximate the second vertical ends 306 of the adjacent panel assemblies. The airflow restrictors 392 may extend in a complementary shape to the arrangement of the working components of the header sections 312, 314 (e.g., the manifolds 242 and 248 and header areas 320, or the manifolds 244 and 246 and the header areas 322) so as to minimize clearance space between the working areas of the panel assemblies 300 and the airflow restrictors 392. This may reduce any "dead space" in the airflow gaps 216 and optimize surface area contact between the airstream and the working areas of the panel assemblies 300.

Figure 12:
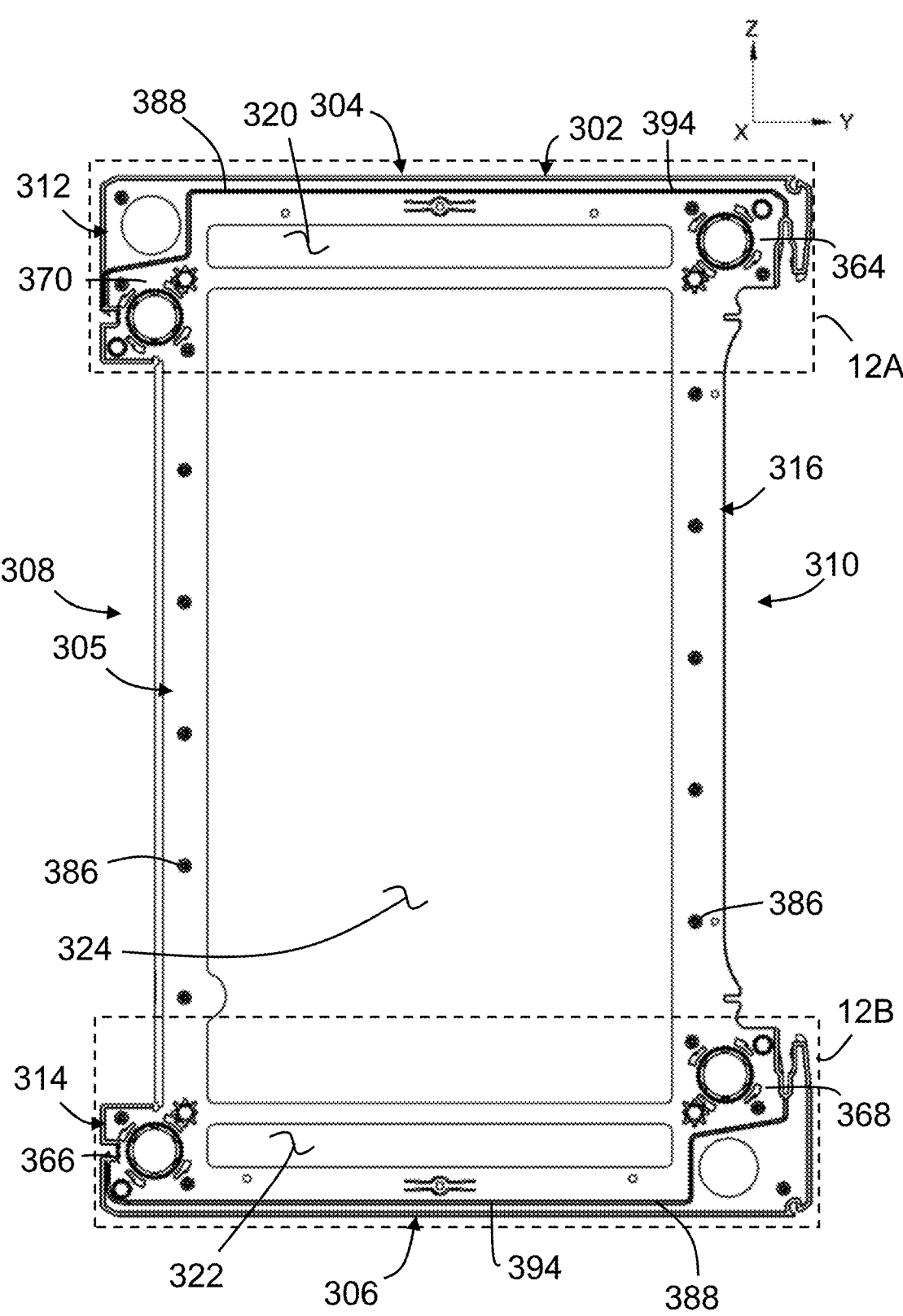
FIG. 12 is an isolated, right side elevation of a frame of the panel assembly of FIG. 7.
Figures 12A, 12B:
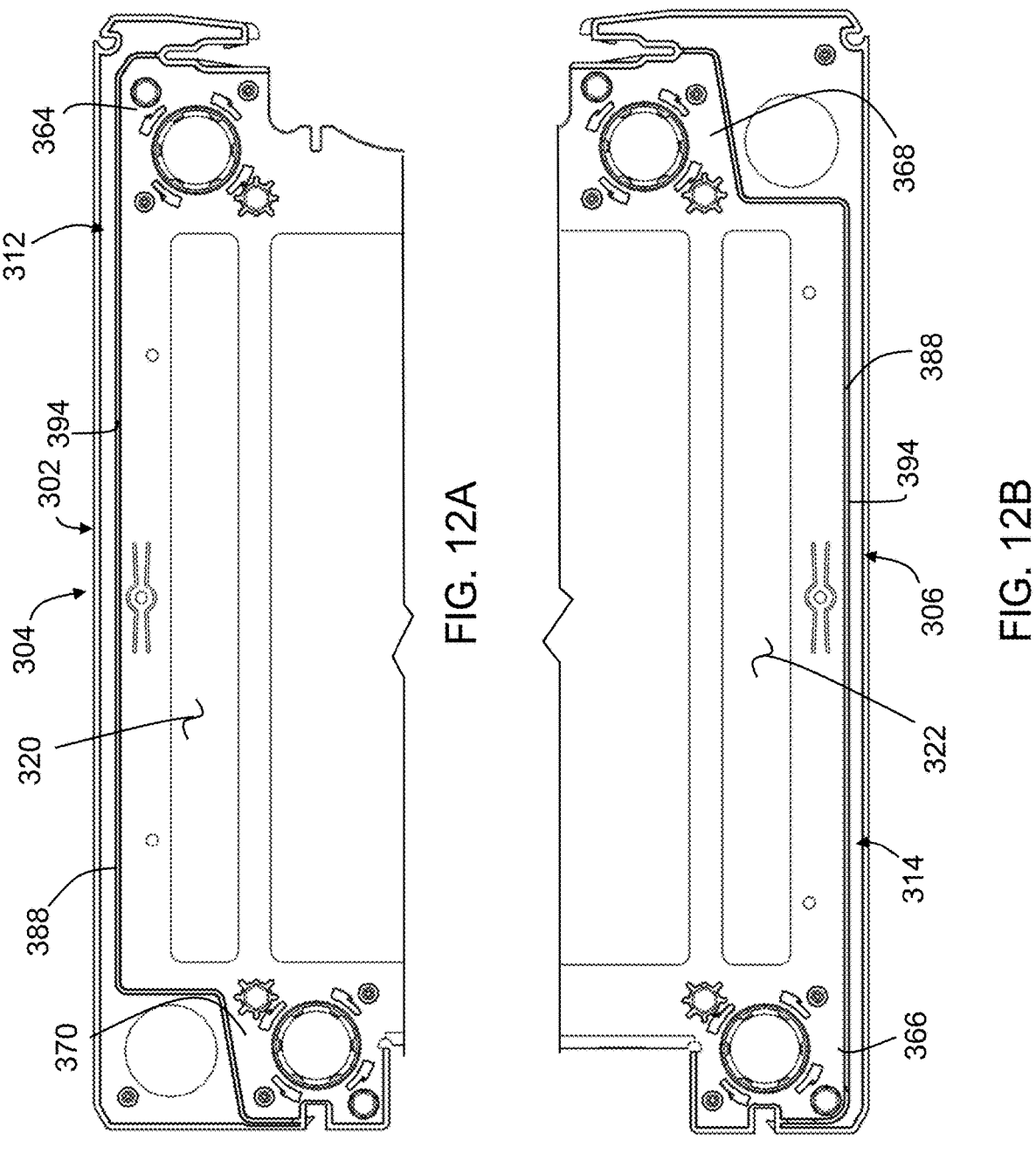
FIGS. 12A and 12B are enlarged views of the areas 12A and 12B, respectively, in FIG. 12.
Figure 13:
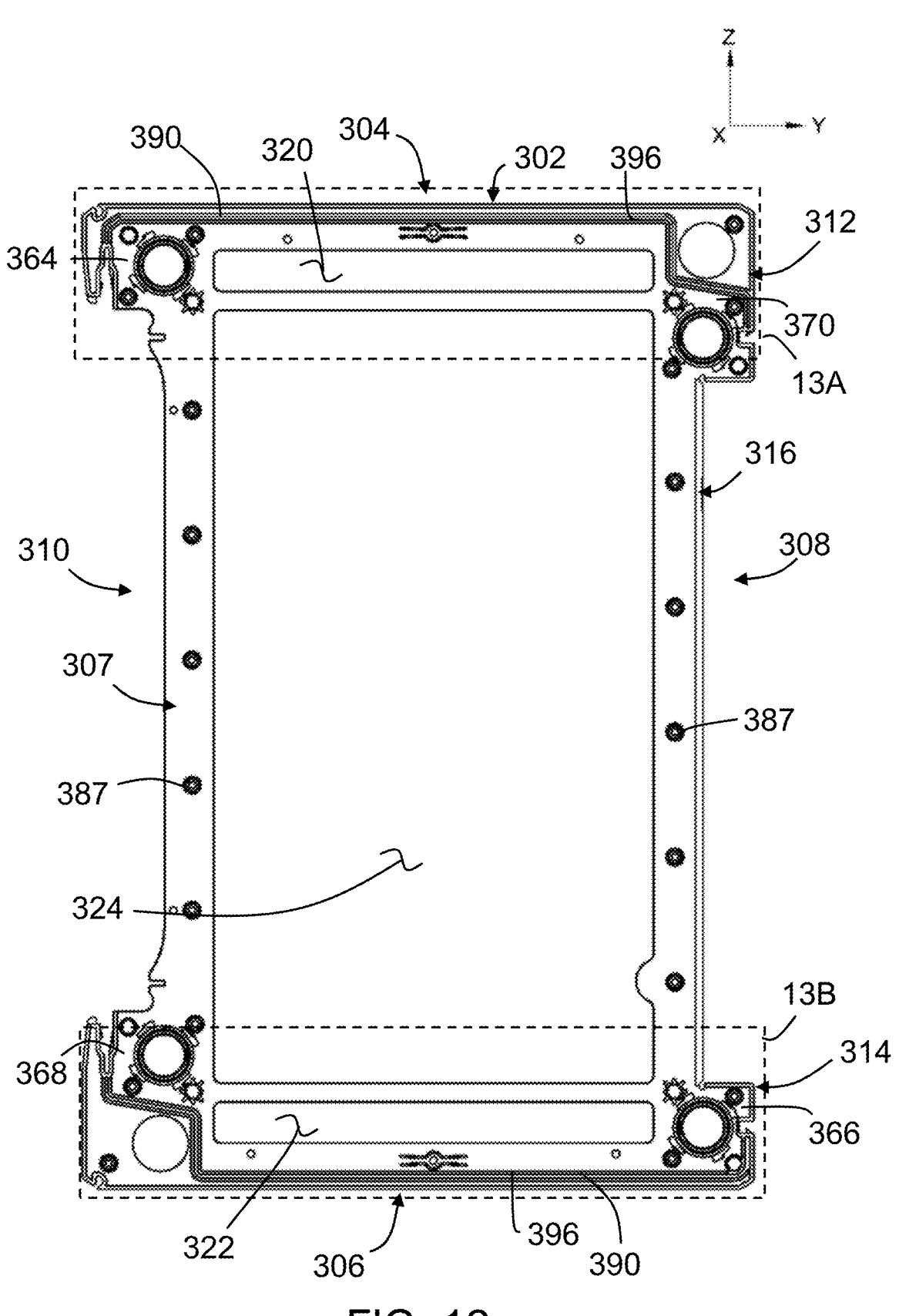
FIG. 13 is an isolated, left side elevation of the frame.
Figures 13A, 13B:
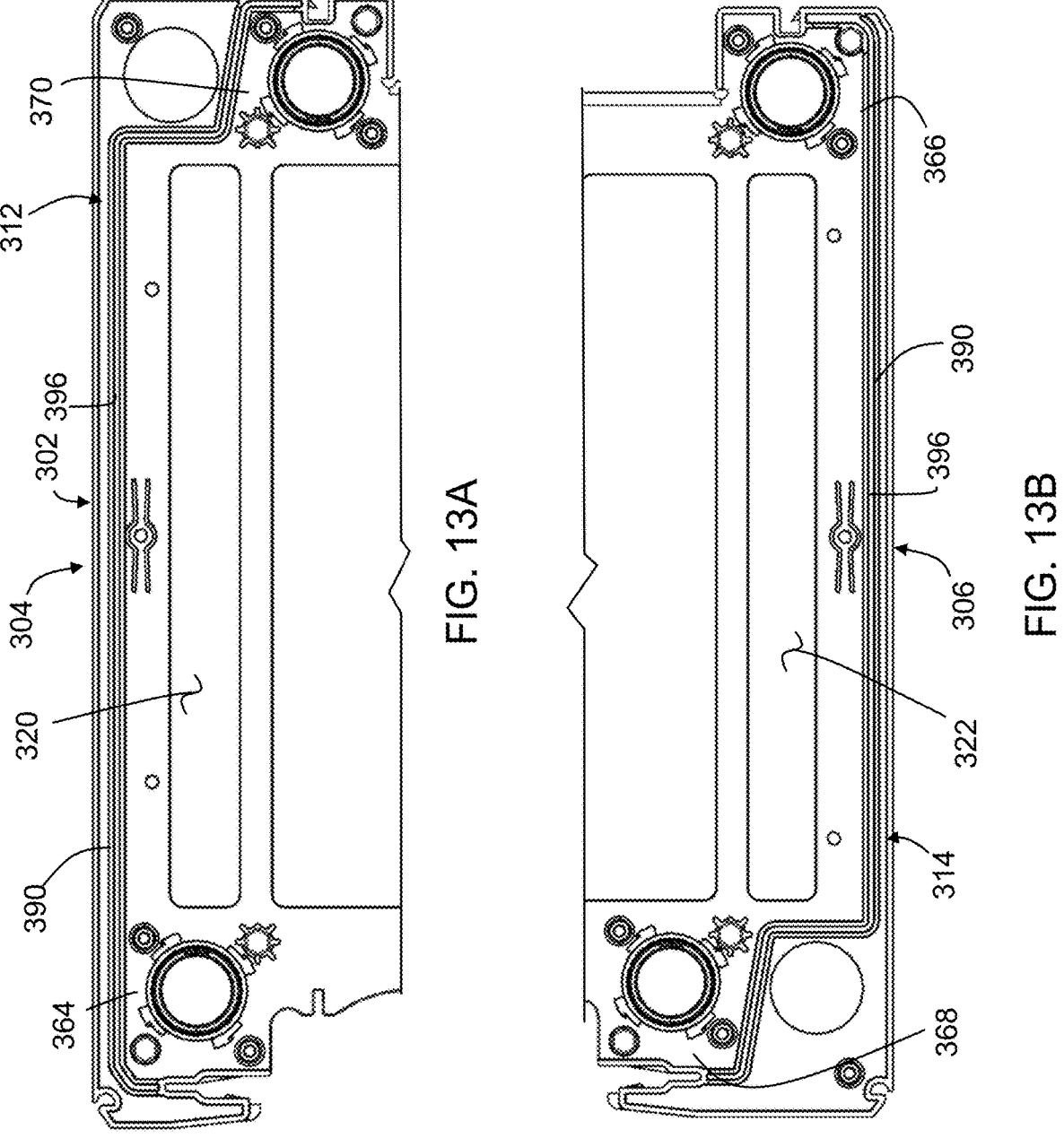
FIGS. 13A and 13B are enlarged views of the areas 13A and 13B, respectively, in FIG. 13.

Each airflow restrictor 392 is formed between two adjacent panel assemblies 300 by engagement or cooperation between a first airflow restrictor member 388 on each header section 312, 314 of one of the adjacent panel assemblies 300 (a "first" panel assembly) and a second airflow restrictor member 390 on each header section 312, 314 of the other one of the adjacent panel assemblies 300 (a "second" panel assembly). The first airflow restrictor members 388 are shown in FIG. 12 and the second airflow restrictor members 390 are shown in FIG. 13. FIGS. 12A and 12B are enlarged views of the areas 12A and 12B, respectively, in FIG. 12, showing the first airflow restrictor members 388 in greater detail. FIGS. 13A and 13B are enlarged views of the areas 13A and 13B, respectively, in FIG. 13, showing the second airflow restrictor members 390 in greater detail.

The first airflow restrictor members 388 are located on the first lateral face 305 of the frame 302, one on each header section 312, 314. The first airflow restrictor members 388 protrude laterally from the lateral face 305 of the frame 302 and each first airflow restrictor member defines a ridge 394 extending between the first longitudinal end 308 and the second longitudinal end 310 of the frame 302. The ridge 394 is a male mating element for forming the airflow restrictor 392 and the first airflow restrictor members 388 may also be referred to as male airflow restrictor members 388. The longitudinal extent of the ridge 394 on the first header section 312 is shaped such that the ridge 394 extends proximate and vertically above each of the fourth corner flange 370, the liquid desiccant header area 320, and the first corner flange 364. The longitudinal extent of the ridge 394 on the second header section 314 is shaped such that the ridge 394 extends proximate and vertically below each of the second corner flange 366, the liquid desiccant header area 322, and the third corner flange 368. The longitudinal extents of the ridges 394 may be such that the ridges are in close vertical proximity to the respective liquid desiccant header areas 320, 322 and the respective corner flanges 364-370 to minimize the vertical clearance between the working areas of the panel assembly and the first airflow restrictor members 388 while preventing the first airflow restrictor members from interfering with the liquid desiccant header areas 320, 322 and the corner flanges 364-370.

The second airflow restrictor members 390 are located on the second lateral face 307 of the frame 302, one on each header section 312, 314. The second airflow restrictor members 390 protrude laterally from the lateral face 307 of the frame 302 and each second airflow restrictor member defines a valley 396 extending between the first longitudinal end 308 and the second longitudinal end 310 of the frame 302. The second airflow restrictor members 390 are located on the second lateral face 307 at corresponding locations to the first airflow restrictor members 388 on the first lateral face 305. The valley 396 is a female mating element for forming the airflow restrictor 392, and the valley 396 is sized and shaped to receive a corresponding ridge 394. The second airflow restrictor members 390 may also be referred to as female airflow restrictor members 390. The longitudinal extent of the valley 396 on the first header section 312 corresponds to the longitudinal extent of the ridge 394 on the first header section, and is shaped such that the valley 396 extends proximate and vertically above each of the fourth corner flange 370, the liquid desiccant header area 320, and the first corner flange 364. The longitudinal extent of the valley 396 on the second header section 314 corresponds to the longitudinal extent of the ridge 394 on the second header section, and is shaped such that the valley 396 extends proximate and vertically below each of the second corner flange 366, the liquid desiccant header area 322, and the third corner flange 368. The longitudinal extents of the valleys 396 may, similar to the ridges 394, be such that the valleys are in close vertical proximity to the respective liquid desiccant header areas 320, 322 and the respective corner flanges 364-370 to minimize the vertical clearance between the working areas of the panel assembly and the second airflow restrictor members 388 while preventing the second airflow restrictor members from interfering with the liquid desiccant header areas 320, 322 and the corner flanges 364-370.

The airflow restrictor members 388, 390 and the frame 302 may be made integrally from one material, such as a polymer or thermoplastic material (e.g., polyolefins such as polypropylene and/or polyethylene). For example, the airflow restrictor members 388, 390 and the frame 302 may be made integrally from a thermoplastic or polymer material using injection molding. Making the airflow restrictor members 388, 390 and the frame 302 integrally from one material may provide an additional advantage of material and cost savings during manufacture of the frame 302. Alternatively, the airflow restrictor members 388, 390 may be components that are attached to the frame 302 at the corresponding locations on the first and second header sections 310, 312. In these examples, the airflow restrictor members 388, 390 may be attached to the frame 302 by welding, adhesive bonding, thermal bonding, solid-state attachment (e.g., ultrasonic welding), or another suitable technique for joining materials together.

Figure 14:
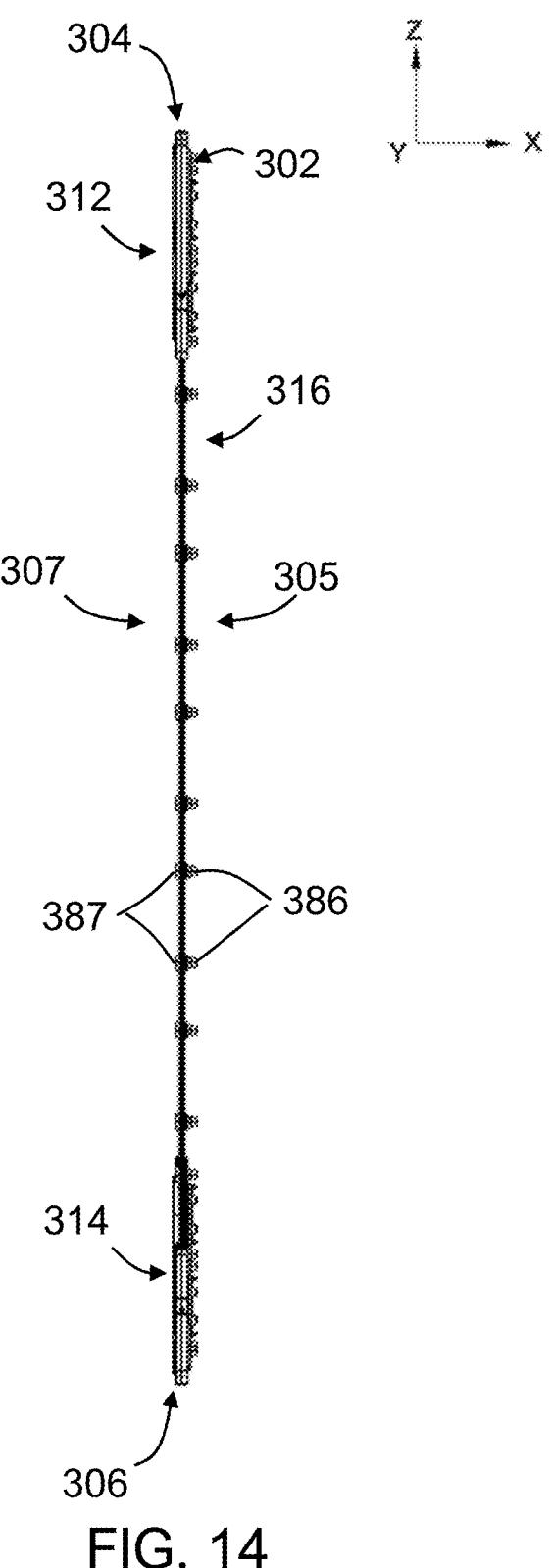
FIG. 14 is an isolated, front elevation of the frame.

Referring to FIG. 14, which is an isolated, front elevation of the frame 302, a width or thickness of the frame 302 (measured in the X-axis between the lateral faces 305, 307) is reduced at the middle section 316 relative to a width or thickness at the header sections 312, 314. The reduced width of the middle section 316 enables the adjacent panel assemblies 300 to be spaced apart laterally over their adjacent middle sections 316 to define the airflow gaps 216. The relatively greater thickness of the frame 302 at the header sections 312, 314 enables the adjacent panel assemblies 300 to connect at their adjacent header sections 312, 314 (e.g., via the corner flanges 364-370). For example, as described above with reference to FIGS. 10A-10D, the corner flanges 364-370 include connectors (e.g., the snap fittings 372 and the corresponding bores 374, the alignment holes 376 for receiving clamping assemblies, and/or the flange collars 378 and corresponding grooved mouths 380) used for connecting adjacent panel assemblies 300.

The airflow gaps 216, defined by the reduced thickness of the middle sections 316 of the adjacent panel assemblies 300, may be maintained by the standoffs or spacers 386 extending laterally between the middle sections 316 of adjacent panel assemblies 300. As shown in FIGS. 12 and 14, the spacers 386 are located in vertical arrangement proximate both the longitudinal ends 308, 310 of the frame 302, on opposite longitudinal sides of the heat transfer fluid area 324. The spacers 386 extend laterally from the first lateral face 305 of the frame 302 in this example. In other examples, the spacers 386 may additionally and/or alternative extend laterally from the second lateral face 307 of the frame 302. Lands 387 (shown in FIG. 13) corresponding to the spacers 386 may be located on the opposite lateral face (the lateral face 307 in this example). The lands 387 may receive the spacers 386 of the adjacent frame 302 and enable the spacers 386 to function as described. The spacers 386 may be the snap fittings 372 described above and the lands 387 may be the corresponding bores 374.

Figure 15:
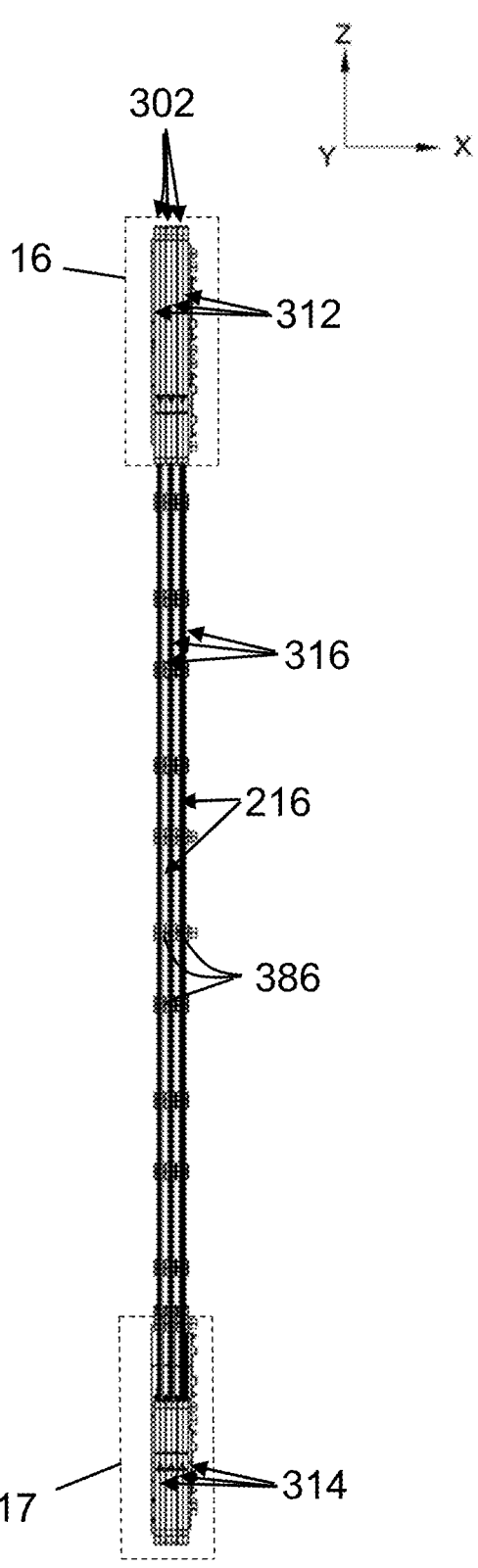
FIG. 15 is a front elevation of three adjacent frames, positioned as assembled in the heat exchanger.

FIG. 15 is a front elevation of three frames 302 of three panel assemblies 300, shown as positioned when the heat exchanger 200 is assembled. Only adjacent frames 302 are shown in FIG. 15, and the plates 326, 328 and membranes 332, 334 are omitted for convenience of illustration and description. The airflow gaps 216 are defined between the adjacent middle sections 316 of the adjacent panel assemblies 300. Each pair of adjacent header sections 312, 314 are connected using connectors located on the corner flanges 364-370 described with reference to FIGS. 10A-10D (e.g., the snap fittings 372 and the corresponding bores 374, the alignment holes 376 for receiving clamping assemblies, and/or the flange collars 378 and corresponding grooved mouths 380). The width of the airflow gaps 216 are maintained using the spacers 386 located between each pair of adjacent middle sections 316.

Figure 16:
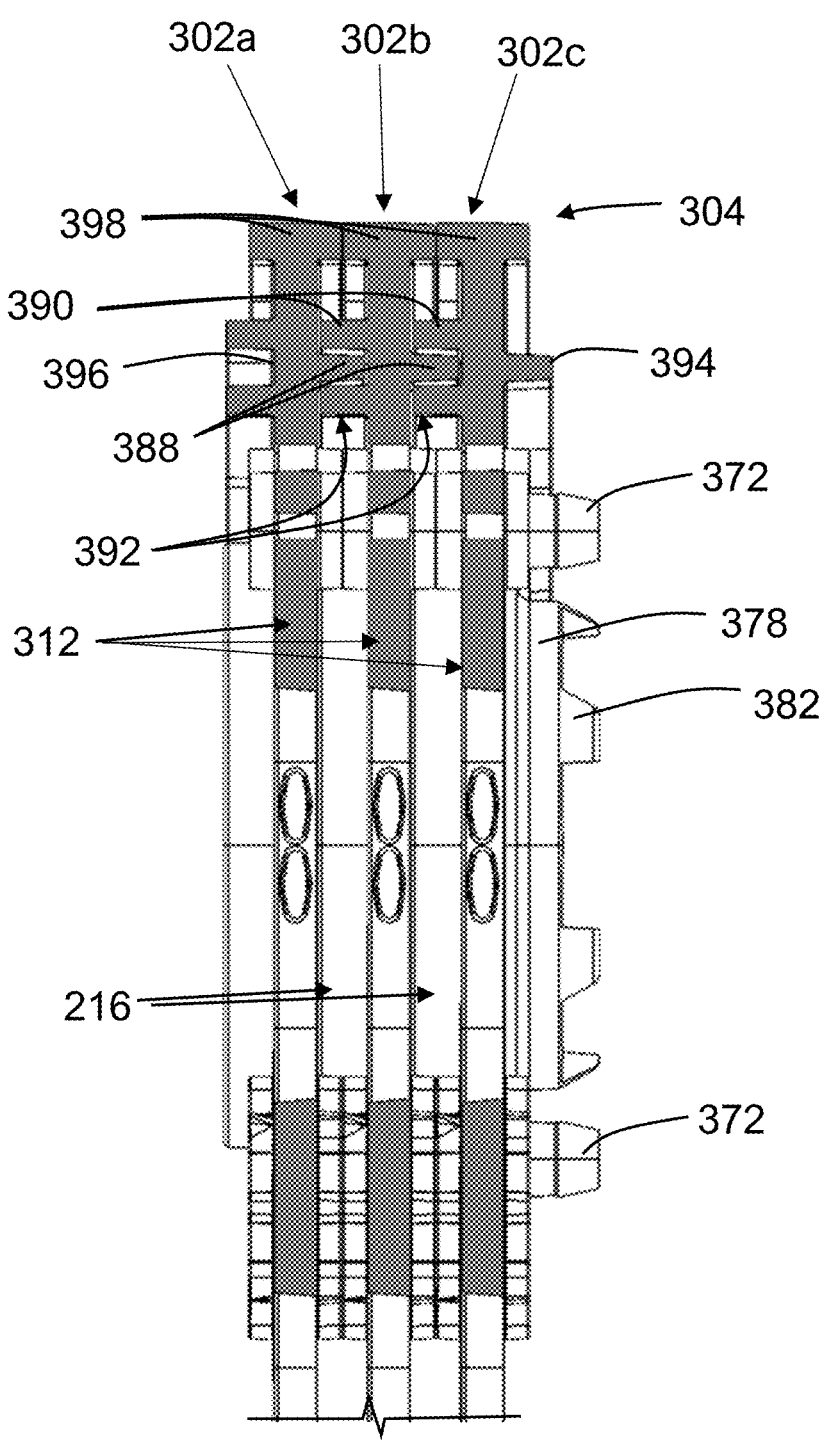
FIG. 16 is a section of the area indicated at the box marked 16 in FIG. 15.
Figure 17:
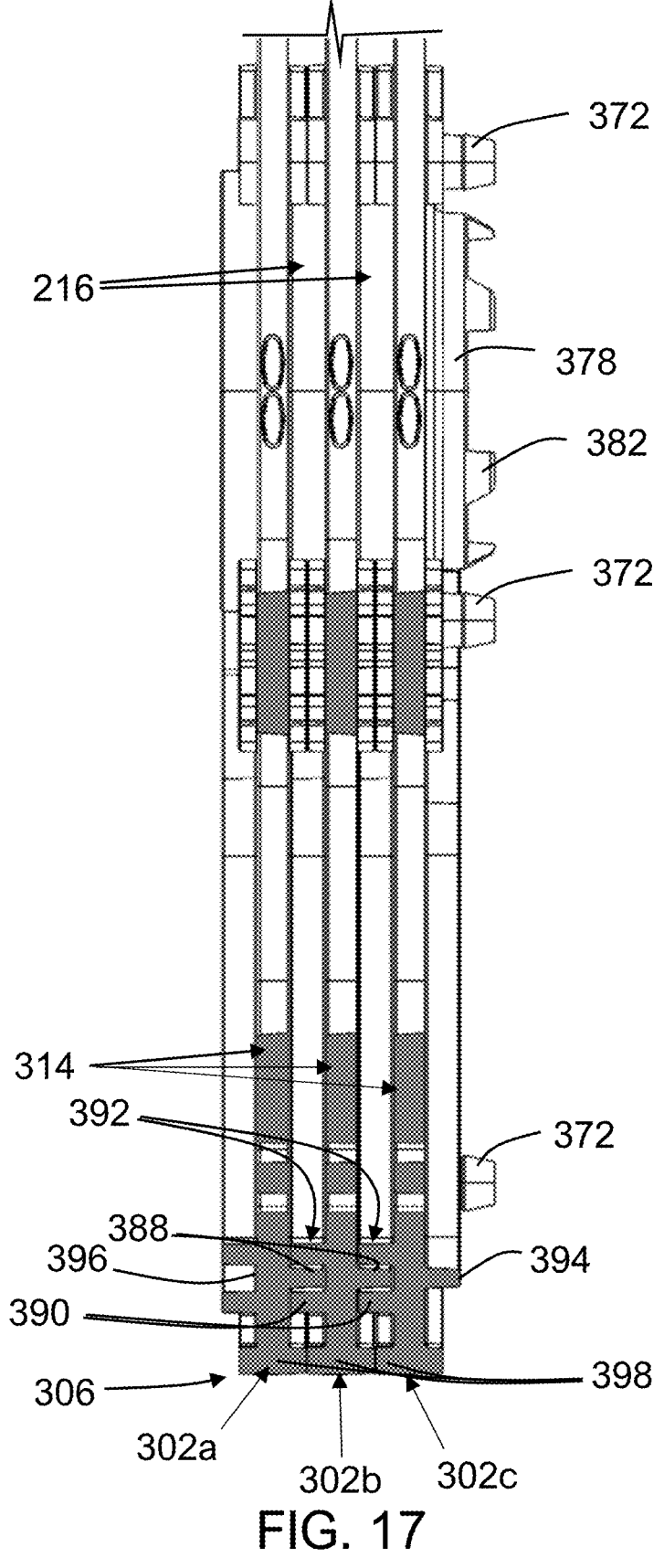
FIG. 17 is a section of the area indicated at the box marked 17 in FIG. 15.

FIGS. 16 and 17 are sections of the areas 16 and 17, respectively, shown in FIG. 15, and show the airflow restrictors 392 formed between each pair of adjacent header sections 312 and each pair of adjacent header sections 314. Two airflow restrictors 392 are formed between a first frame 302a and a second frame 302b, one between the adjacent header sections 312 and one between the adjacent header sections 314. Each airflow restrictor 392 formed between the first and second frames 302a, 302b is formed by engagement between a first airflow restrictor member 388 of the first frame 302a and a second airflow restrictor member 390 of the second frame 302b. In particular, the ridges 394 of the first frame 302a are received by the valleys 396 of the second frame 302b, forming the airflow restrictors 392 which create a tortuous path for air in the airflow gap 216 in a direction other than the airflow direction 278 (e.g., in the vertical direction). Two airflow restrictors 392 are also formed between the second frame 302b and a third frame 302c, one between the adjacent header sections 312 and one between the adjacent header sections 314. Each airflow restrictor 392 formed between the second and third frames 302b, 302c is likewise formed by engagement between a first airflow restrictor member 388 of the second frame 302b and a second airflow restrictor member 390 of the third frame 302c. In particular, the ridges 394 of the second frame 302b are received by the valleys 396 of the third frame 302c, forming the airflow restrictors 392 which create a tortuous path for air in the airflow gap 216 in a direction other than the airflow direction 278 (e.g., in the vertical direction). The two airflow restrictors 392 in each airflow gap 216 are located at opposite ends (e.g., opposite vertical ends) of the airflow gaps 216 and facilitate preventing the air stream flowing through the airflow gaps in the direction other than the airflow direction 278 (e.g., preventing air from leaking vertically through the adjacent panel assemblies 300). Additional restriction and/or limitation to the air stream in the direction other than the airflow direction 278 (e.g., in the vertical direction) may be provided by T-shaped edges 398 at the vertical ends 304, 306 of the frames 302. As shown in FIGS. 16 and 17, adjacent T-shaped edges 398 may engage and/or be in close proximity to create an additional layer of tortuosity to the tortuous path created by the airflow restrictors 392.

Each airflow restrictor 392 may include one or more sealing elements 399 (shown in FIG. 18) that facilitates creating a mechanical seal in addition to the tortuous path for the air. The sealing element(s) 399 may be positioned between engaging first and second airflow restrictor members 388, 390. For example, the sealing element(s) 399 may be positioned in the valley 396 of the second airflow restrictor member 390 and creates the mechanical seal when the ridge 394 of the first airflow restrictor member 388 is received in the valley 396. In some examples, the sealing element 399 may be an elastomeric seal or gasket that is compressed when the ridge 394 of the first airflow restrictor member 388 is received in the valley 396 of the second airflow restrictor member 390 to create a fluid-tight seal. In other examples, the sealing element 399 may be configured to create a labyrinth seal or another suitable mechanical seal between the engaging first and second airflow restrictor members 388, 390. The sealing element 399 may addition-ally and/or alternatively be a seal created by attaching or fusing the engaging airflow restrictor members 388 and 390 (e.g., attaching or fusing the ridge 394 received within the corresponding valley 396) using a suitable technique for joining materials together. For example, the engaging air-flow restrictor members 388 and 390 may be attached or fused by solid-state attachment (e.g., ultrasonic welding).

Figure 18:
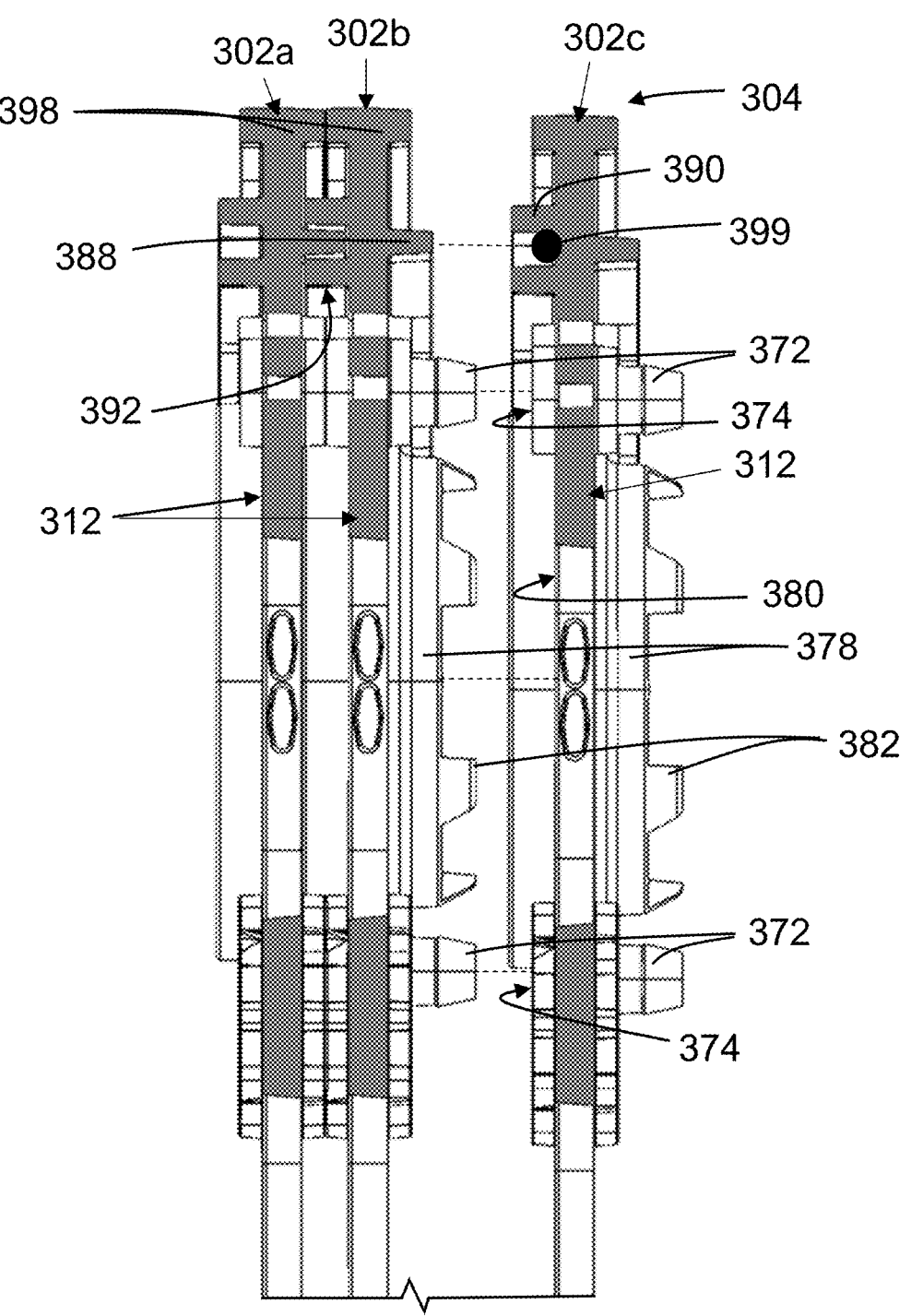
FIG. 18 is another view of the section of FIG. 16 showing one frame detached from the adjacent frame.

FIG. 18 is another view of the section shown in FIG. 16 with the third frame 302c separated from the second frame 302b. The third frame 302c is brought into connection with the second frame 302b using connectors at the header sections 312, 314 (e.g., by inserting the snap fittings 372 of the second frame 302b in the corresponding bores 374 of the third frame 302c and/or inserting the flange collars 378 of the second frame 302b in the corresponding grooved mouths 380 of the third frame 302b). The first airflow restrictor members 388 of the second frame 302b engage with (e.g., is received by) the second airflow restrictor members 390 of the third frame 302b, which may facilitate aligning the frames 302b, 302c at their header sections 312, 314 and aligning the connectors for connecting the frames 302b, 302c. The first and second airflow restrictor members 388, 390 may thereby facilitate easier assembly of the panel assemblies 300.

The engagement between the first and second airflow restrictor members 388, 390 of adjacent frames 302 (e.g., the frames 302a, 302b and the frames 302b, 302c) may facilitate providing structure and rigidity to the adjacent panel assem-blies 300 when assembled. For example, each pair of engaging first and second airflow restrictor members 388, 390 may restrict or limit relative movement of adjacent panel assemblies 300 in the vertical and/or longitudinal directions. In some examples, the engaging first and second airflow restrictor members 388, 390 may allow for relative lateral movement of the adjacent panel assemblies 300 while limiting or restricting relative vertical and/or longitudinal movement. In particular, the second airflow restrictor mem-bers 390 may be suitably sized and shaped to receive the corresponding first airflow restrictor members 388 without creating a friction or press fit between the first and second airflow restrictor members 388, 390. This may enable easier disassembly of the panel assemblies 300, and separate discrete components (e.g., the connectors of the corner flanges 364-370 and/or the spacers 386) that are easier to disconnect may be used to connect and maintain spacing between adjacent panel assemblies 300. A substantially frictionless engagement between the engaging first and second airflow restrictor members 388, 390 may addition-ally and/or alternatively allow the panel assemblies 300 to expand and compress in the lateral direction in operation of the heat exchanger 200 at various temperatures. In other examples, the first and second airflow restrictor members 388, 390 of adjacent panel assemblies 300 may engage by friction.

FIG. 19 is an example method 400 of operating a three-way heat exchanger (e.g., the three-way heat exchanger 200). The method 400 includes channeling 402 a heat transfer fluid through panel assemblies 300 of the three-way heat exchanger 200. Each panel assembly includes the frame 302 that defines a heat transfer fluid channel 330 through which the heat transfer fluid is channeled. The method 400 also includes channeling 404 a liquid desiccant through desiccant channels 336, 338 of the panel assemblies 300. The desiccant channels 336, 338 are defined between the frames 302 of the panel assemblies 300 and membranes 332, 334, each membrane 332, 334 attached to one of the frames

302. The method 400 also includes channeling 406 an inlet air stream through the three-way heat exchanger 200 in an airflow direction 278. The inlet air stream flows through airflow gaps 216 defined between adjacent panel assemblies 300. The method 400 also includes restricting 408 (or limiting) flow of the air being channeled through the three-way heat exchanger in a direction other than the airflow direction 278 using airflow restrictors 392 positioned in the airflow gaps 216. The airflow direction 278 may be a horizontal direction (e.g., a longitudinal direction) and restricting 408 the flow of the air in the direction other than the airflow direction may include restricting the flow of the air in a vertical direction using the airflow restrictors 392 located at opposite vertical ends of each airflow gap 216. The method 400 may also include maintaining a width of each airflow gap 216 while channeling the air through the three-way heat exchanger using spacers 386 located in each airflow gap 216, where the spacers 386 are separate from the airflow restrictors 392.

Example systems and methods described include three-way heat exchangers operable to remove heat and moisture from a flow of air and/or rejecting heat and moisture into a flow of air. The three-way heat exchanger may include panel assemblies through which heat transfer fluid and liquid desiccant are channeled and airflow gaps defined between adjacent panel assemblies for channeling air therethrough in an airflow direction. An example panel assembly of the three-way heat exchanger includes a frame, two sheets attached to the frame to define a heat transfer fluid channel, and a membrane attached each sheet to define desiccant channels. Airflow restrictors are positioned in each airflow gap between adjacent panel assemblies and facilitate limit-ing or preventing flow of the air in a direction other than the airflow direction. For example, the air may flow horizontally through the heat exchanger and the airflow restrictors may be located at opposite vertical ends of the airflow gaps to limit or prevent air from leaking vertically through the adjacent panel assemblies. The airflow restrictors may be formed by airflow restrictor members of each panel assem-bly that engage the airflow restrictor members of the adja-cent panel assemblies. Engagement between the airflow restrictor members may also facilitate easier assembly by aligning connectors used to connect adjacent panel assem-blies and/or provide structure and rigidity to adjacent panel assemblies, for example, by limiting relative movement of the adjacent panel assemblies. In some examples, the airflow restrictor members and the frame are made integrally from one material which may reduce material and manufacturing costs and otherwise facilitate easier manufacture and assem-bly of the panel assemblies.

Embodiments of HVAC systems and methods of operat-ing the systems are described above in detail. The systems and methods are not limited to the specific embodiments described herein, but rather, components of the system and methods may be used independently and separately from other components described herein. For example, the sys-tems and methods described herein may be used in systems other than HVAC systems.

When introducing elements of the present disclosure or the embodiment(s) thereof, the articles "a", "an", "the" and "said" are intended to mean that there are one or more of the elements. The terms "comprising," "including," "contain-ing" and "having" are intended to be inclusive and mean that there may be additional elements other than the listed elements. The use of terms indicating a particular orientation (e.g., "top", "bottom", "side", "vertical", "lateral", "longitudinal", etc.) is for convenience of description and does not require any particular orientation of the item described.

The terms "about," "substantially," "essentially" and "approximately," and their equivalents, when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

As various changes could be made in the above constructions and methods without departing from the scope of the disclosure, all matter contained in the above description and shown in the accompanying drawing(s) shall be interpreted as illustrative and not in a limiting sense.

What is claimed is:

1. A three-way heat exchanger operable to transfer heat between a heat transfer fluid, a liquid desiccant, and air, the three-way heat exchanger comprising:

an airflow inlet and an airflow outlet; and panel assemblies arranged with airflow gaps defined between adjacent panel assemblies to allow the air to flow between the airflow inlet and the airflow outlet in an airflow direction, each panel assembly comprising:

a frame including two header sections and a middle section extending between the header sections, the middle section defining a heat transfer fluid channel;

a membrane positioned on the frame and defining a desiccant channel; and two airflow restrictor members positioned at each header section of the frame, wherein, for each header section, a first airflow restrictor member is on a first face of the frame and a second airflow restrictor member is on a second face of the frame;

wherein, for each pair of adjacent panel assemblies, the middle sections of the adjacent panel assemblies are spaced apart to define the airflow gap, and the first airflow restrictor members of a first panel assembly engage the second airflow restrictor members of a second panel assembly to form two airflow restrictors in the airflow gap, and wherein the airflow restrictors are located at opposite ends of the airflow gap relative to a direction other than the airflow direction.

2. The three-way heat exchanger of claim 1, wherein, for each panel assembly, the first airflow restrictor members define ridges extending on the first face of the frame and the second airflow restrictor members define valleys on the second face of the frame, and wherein, for each pair of adjacent panel assemblies, the ridges defined by the first airflow restrictor members of the first panel assembly are received by the valleys defined by the second airflow restrictor members of the second panel assembly to form the two airflow restrictors.

3. The three-way heat exchanger of claim 1, wherein each airflow restrictor defines a tortuous path for flow of the air in the direction other than the airflow direction.

4. The three-way heat exchanger of claim 1, defining mutually perpendicular lateral, longitudinal, and vertical directions, wherein the panel assemblies are arranged in the lateral direction, the airflow direction is in the longitudinal direction, and the two airflow restrictors are located at the opposite ends of the airflow gap relative to the vertical direction.

5. The three-way heat exchanger of claim 1, wherein, for each pair of adjacent panel assemblies, the header sections of the adjacent panel assemblies are connected using connectors that are separate from the airflow restrictor members.

6. The three-way heat exchanger of claim 1, wherein, for each header section of each frame of each panel assembly, the header section includes a liquid desiccant header area connected to the desiccant channel of the panel assembly, and the liquid desiccant header area is located inboard of the first and second airflow restrictor members relative to the direction other than the airflow direction.

7. The three-way heat exchanger of claim 1, wherein, for each panel assembly, the first airflow restrictor members, the second airflow restrictor members, and the frame are made integrally from one material.

8. The three-way heat exchanger of claim 7, wherein, for each panel assembly, the first airflow restrictor members, the second airflow restrictor members, and the frame are made integrally from an injection-molded polymer material.

9. The three-way heat exchanger of claim 1, wherein engagement between the first airflow restrictor members and the second airflow restrictor members provides rigidity to the adjacent panel assemblies.

10. The three-way heat exchanger of claim 1, wherein each airflow restrictor includes a sealing element positioned between the first and second airflow restrictor members.

11. The three-way heat exchanger of claim 10, wherein the sealing element is an elastomeric seal.

12. A three-way heat exchanger to transfer heat between a heat transfer fluid, a liquid desiccant, and air, the three-way heat exchanger defining mutually perpendicular lateral, longitudinal, and vertical directions, the three-way heat exchanger comprising:

an airflow inlet and an airflow outlet;

panel assemblies arranged in the lateral direction with airflow gaps defined between adjacent panel assemblies to allow the air to flow between the airflow inlet and the airflow outlet in the longitudinal direction, each panel assembly comprising:

a frame defining a heat transfer fluid channel; and a membrane positioned on the frame and defining a desiccant channel; and two airflow restrictors located in each airflow gap between each pair of adjacent panel assemblies, wherein each airflow restrictor defines a tortuous path for flow of the air in the vertical direction, and wherein, for each pair of adjacent panel assemblies, one of the airflow restrictors is positioned vertically above the heat transfer fluid channels and the desiccant channels and another one of the airflow restrictors is positioned vertically below the heat transfer fluid channels and the desiccant channels.

13. The three-way heat exchanger of claim 12, wherein each pair of adjacent panel assemblies is connected using connectors that are separate from the airflow restrictors.

14. The three-way heat exchanger of claim 12, wherein spacers are located between each pair of adjacent panel assemblies, the spacers being separate from the airflow restrictors, wherein the spacers operate to maintain a width of the airflow gaps.

15. The three-way heat exchanger of claim 12, wherein each panel assembly includes a middle section defining the heat transfer fluid channel and two header sections at opposite vertical ends of the middle section, wherein each header section includes a first airflow restrictor member on a first face of the frame and a second airflow restrictor member on a second face of the frame, and wherein, for each pair of adjacent panel assemblies, the middle sections of the adjacent panel assemblies are spaced apart to define the airflow gap, and the first airflow restrictor members of a first panel assembly engage the second airflow restrictor members of a second panel assembly to form the two airflow restrictors.

16. The three-way heat exchanger of claim 15, wherein, for each header section of each frame of each panel assembly, the header section includes a liquid desiccant header area connected to the desiccant channel of the panel assembly, and the liquid desiccant header area is located vertically inboard of the first and second airflow restrictor members.

17. The three-way heat exchanger of claim 15, wherein, for each panel assembly, the first airflow restrictor members, the second airflow restrictor members, and the frame are made integrally from one material.

18. A method of operating a three-way heat exchanger, the method comprising:

channeling a heat transfer fluid through panel assemblies of the three-way heat exchanger, wherein each panel assembly includes a frame defining a heat transfer fluid channel through which the heat transfer fluid is channeled;

channeling a liquid desiccant through desiccant channels of the panel assemblies defined between the frames of the panel assemblies and membranes attached to the frames;

channeling air through the three-way heat exchanger in an airflow direction, wherein the air flows through airflow gaps defined between adjacent panel assemblies; and restricting flow of the air being channeled through the three-way heat exchanger in a direction other than the airflow direction using airflow restrictors positioned in the airflow gaps.

19. The method of claim 18, wherein the airflow direction is a horizontal direction and restricting the flow of the air in the direction other than the airflow direction comprises restricting the flow of the air in a vertical direction using the airflow restrictors.

20. The method of claim 18, further comprising maintaining a width of each airflow gap while channeling the air through the three-way heat exchanger using spacers located in each airflow gap, wherein the spacers are separate from the airflow restrictors.

\* \* \* \* \*